US012689688B2

(12) United States Patent
Kim

(10) Patent No.: US 12,689,688 B2
(45) Date of Patent: Jul. 21, 2026

(54) ELECTRONIC DEVICE FOR MOVING POSITION OF VISUAL OBJECT LOCATED IN FOLDING AREA AND METHOD FOR CONTROLLING SAME

(71) Applicant: SAMSUNG ELECTRONICS CO., LTD., Suwon-si (KR)

(72) Inventor: Hyeryoung Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 789 days.

(21) Appl. No.: 17/966,130

(22) Filed: Oct. 14, 2022

(65) Prior Publication Data

US 2023/0122806 A1     Apr. 20, 2023

Related U.S. Application Data

(63) Continuation of application No. PCT/KR2022/015521, filed on Oct. 13, 2022.

(30) Foreign Application Priority Data

Oct. 15, 2021     (KR) ........................ 10-2021-0137929
Dec. 30, 2021     (KR) ........................ 10-2021-0193023

(51) Int. Cl.
*H04M 1/72454*     (2021.01)
*H04M 1/02*     (2006.01)
*H04M 1/72469*     (2021.01)

(52) U.S. Cl.
CPC ..... *H04M 1/72454* (2021.01); *H04M 1/0216* (2013.01); *H04M 1/0268* (2013.01); *H04M 1/72469* (2021.01); *H04M 2201/38* (2013.01)

(58) Field of Classification Search
CPC ......... H04M 1/72454; H04M 1/72469; H04M 1/0268; H04M 2201/38; H04M 1/0216
See application file for complete search history.

(56) References Cited

U.S. PATENT DOCUMENTS 10,739,898 B2     8/2020   Kim et al.
11,687,350 B2     6/2023   Min et al.
(Continued)

FOREIGN PATENT DOCUMENTS

KR     20160016521 A     2/2016
KR     20160108705 A     9/2016
(Continued)

OTHER PUBLICATIONS

International Search Report with English Translation and Written Opinion for International Application No. PCT/KR2022/015521; International Filing Date Aug. 30, 2022; Date of Mailing Nov. 25, 2022; 72 pages.

(Continued)

*Primary Examiner* — Jinsong Hu
*Assistant Examiner* — Farideh Madani
(74) *Attorney, Agent, or Firm* — CANTOR COLBURN LLP

(57)     ABSTRACT

Electronic devices for moving a visual object located in a folding area and methods for controlling the same are provided. A foldable device according to an embodiment may include at least one sensor, a flexible display, and at least one processor. The at least one processor is configured to detect a folding angle of the foldable device by using the at least one sensor and detect that at least a part of a visual object is displayed in a folding area of the foldable device. In response to the detected folding angle being equal to or less than a predesignated angle, move, based on the displaying of the at least part of the visual object in the folding area, the visual object to an area other than the folding area and display the visual object in such area other than the folding area.

11 Claims, 28 Drawing Sheets

(56)                     References Cited

U.S. PATENT DOCUMENTS

| | | | |
|---|---|---|---|
| 2013/0215041 | A1 | 8/2013 | Kim et al. |
| 2014/0218321 | A1 | 8/2014 | Lee et al. |
| 2015/0378557 | A1 | 12/2015 | Jeong et al. |
| 2016/0034047 | A1 | 2/2016 | Lee et al. |
| 2016/0085319 | A1 | 3/2016 | Kim et al. |
| 2016/0259514 | A1* | 9/2016 | Sang .................... G06F 1/1626 |
| 2020/0125144 | A1 | 4/2020 | Chung et al. |
| 2020/0126519 | A1* | 4/2020 | Heo ...................... G06F 3/0488 |
| 2020/0192547 | A1 | 6/2020 | Kim et al. |
| 2021/0149542 | A1 | 5/2021 | Kim et al. |
| 2021/0216332 | A1 | 7/2021 | Li |
| 2023/0044497 | A1* | 2/2023 | Zhang ................... G06F 1/1677 |

FOREIGN PATENT DOCUMENTS

| | | | |
|---|---|---|---|
| KR | 20160126942 | A | 11/2016 |
| KR | 20170054056 | A | 5/2017 |
| KR | 102097361 | B1 | 4/2020 |
| KR | 20200045746 | A | 5/2020 |
| KR | 20200074553 | A | 6/2020 |

OTHER PUBLICATIONS

Korean Office Action for Korean Application No. 10-2021-0193023; Report Mail Date Jan. 2, 2026 (17 Pages; with Translation).

* cited by examiner

510
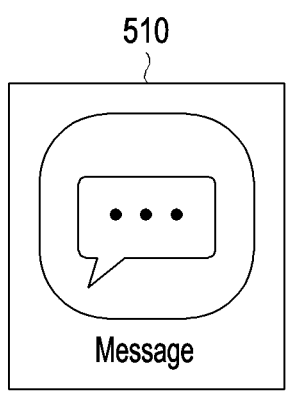
FIG. 5A
520
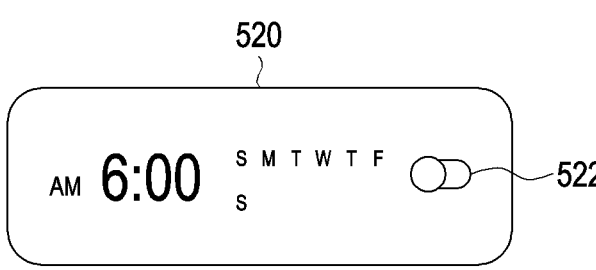
522
FIG. 5B
530
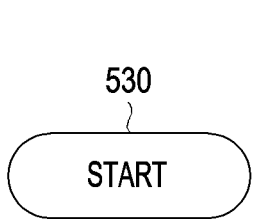
FIG. 5C
540
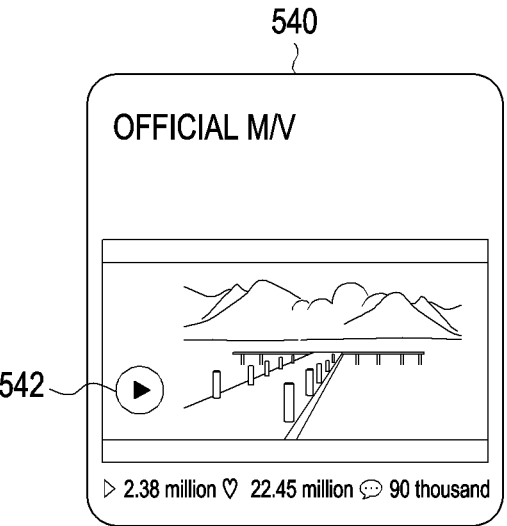
542
FIG. 5D

550

| ○ | Selection item | 01 |
| ⊘ | Selection item | 02 |
| ○ | Selection item | 03 |
| ⊘ | Selection item | 04 |
| ⊘ | Selection item | 05 |
| ○ | Selection item | 06 |
| ○ | Selection item | 07 |

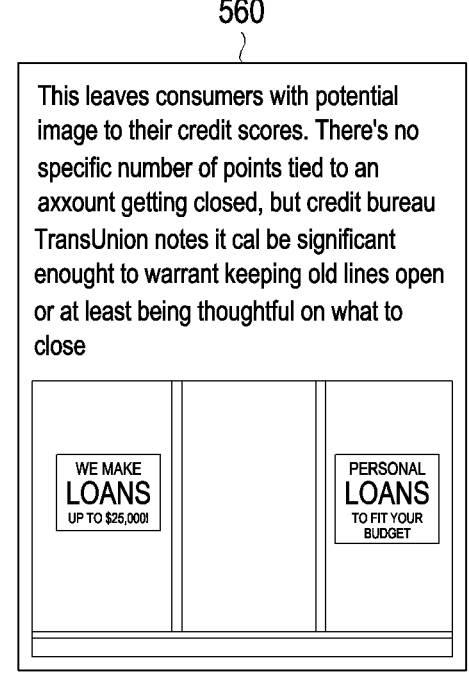

This leaves consumers with potential image to their credit scores. There's no specific number of points tied to an axxount getting closed, but credit bureau TransUnion notes it cal be significant enought to warrant keeping old lines open or at least being thoughtful on what to close

WE MAKE
LOANS
UP TO $25,000!

PERSONAL
LOANS
TO FIT YOUR
BUDGET

| DOW | S&P 500 | NASDAQ |
| 34,996.18 | 4,384.63 | 14,733.24 |
| +0.36% | +0.35% | +0.21% |

Market Movers

| SPCE | | 40.69 |
| | | -17.30% |
| | | Pre: -8.21% |
| SGOC | | 20.00 |
| | | +104.29% |
| | | Pre: +17.00% |

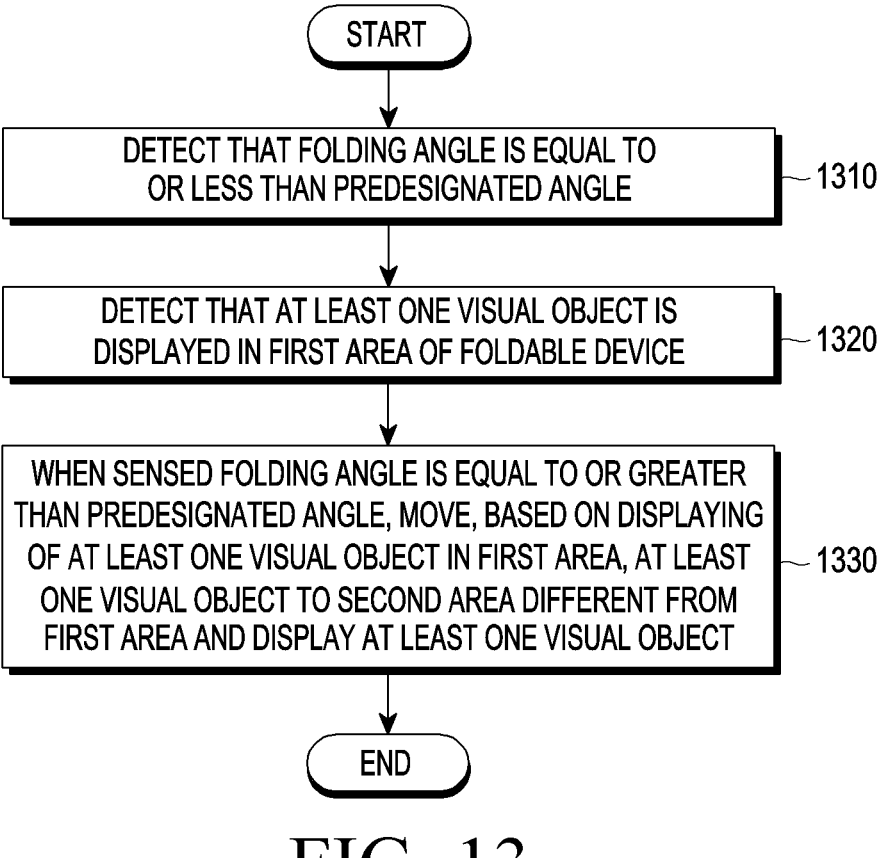

START

DETECT THAT FOLDING ANGLE IS EQUAL TO
OR LESS THAN PREDESIGNATED ANGLE ~1310

DETECT THAT AT LEAST ONE VISUAL OBJECT IS
DISPLAYED IN FIRST AREA OF FOLDABLE DEVICE ~1320

WHEN SENSED FOLDING ANGLE IS EQUAL TO OR GREATER
THAN PREDESIGNATED ANGLE, MOVE, BASED ON DISPLAYING
OF AT LEAST ONE VISUAL OBJECT IN FIRST AREA, AT LEAST
ONE VISUAL OBJECT TO SECOND AREA DIFFERENT FROM
FIRST AREA AND DISPLAY AT LEAST ONE VISUAL OBJECT ~1330

END

FIG. 13

ELECTRONIC DEVICE FOR MOVING POSITION OF VISUAL OBJECT LOCATED IN FOLDING AREA AND METHOD FOR CONTROLLING SAME

CROSS-REFERENCE TO RELATED APPLICATION(S)

This application is a continuation application, claiming priority under § 365(c), of an International application No. PCT/KR2022/015521, filed on Oct. 13, 2022, which is based on and claims the benefit of a Korean patent application number 10-2021-0193023, filed on Dec. 30, 2021, in the Korean Intellectual Property Office, and to Korean Patent Application No. 10-2021-0137929, filed on Oct. 15, 2021, in the Korean Intellectual Property Office the disclosures of which are incorporated by reference herein in its entireties.

TECHNICAL FIELD

The disclosure relates to electronic devices for moving a position of a visual object located in a folding area, and methods for controlling the same.

BACKGROUND ART

Various services and additional functions provided through electronic devices, for example, portable electronic devices such as smartphones, are gradually increasing. In order to increase the utility value of the electronic devices and satisfy the needs of various users, communication service providers or electronic device manufacturers are competitively developing the electronic devices which provide various functions and differentiate them from other companies. Accordingly, various functions provided through electronic devices are being increasingly advanced.

DETAILED DESCRIPTION OF THE INVENTION

Technical Problem

In using a foldable electronic device, when a user folds the foldable electronic device, it is difficult for the user to perform a touch input on various visual objects (e.g., icons or pop-up windows) positioned in a folded part of a display or screen, and it is also difficult to provide the user with an optimized feeling for the foldable device.

Technical Solution

According to various embodiments of the disclosure, an electronic device configured to move, when at least a part of a visual object is located in a folding area of a foldable device, the position of the visual object to an area other than the folding area may be provided.

According to various embodiments of the disclosure, an electronic device configured to move the position of a visual object located in a first area of a foldable device (e.g., an upper area of the foldable device with reference to a folding axis) to a second area of the foldable device (e.g., a lower area of the foldable device with reference to the folding axis) when the foldable device is folded at a predesignated angle (e.g., 135 degrees) or less may be provided.

An electronic device according to an embodiment of the disclosure may include at least one sensor, a flexible display, and at least one processor, wherein the at least one processor is configured to detect a folding angle of the flexible display (e.g., foldable device) by using the at least one sensor, detect that at least a part of a visual object is displayed in a folding area of the foldable device, and when the detected folding angle is equal to or less than a predesignated angle, move, based on the displaying of the at least part of the visual object in the folding area, the visual object to an area other than the folding area and display the visual object.

An electronic device according to an embodiment of the disclosure may include at least one sensor, a flexible display, and at least one processor, wherein the at least one processor is configured to detect a folding angle of the flexible display (e.g., foldable device) by using the at least one sensor, detect that at least a part of a visual object is displayed in a folding area of the foldable device, and when the sensed folding angle is equal to or less than a predesignated angle, move, based on the displaying of the at least part of the visual object in the folding area, the visual object to an area other than the folding area and display the visual object, the first area and the second area being areas which are distinguished from each other with reference to a folding axis of the foldable device.

A method for controlling a foldable electronic device according to an embodiment of the disclosure may include detecting a folding angle of the foldable electronic device by using at least one sensor of the foldable electronic device, detecting, when the detected folding angle is equal to or less than a predesignated angle as a result of the detecting of the folding angle, that at least a part of a visual object is displayed in a folding area of a foldable display of the foldable electronic device, and moving, based on the displaying of the at least part of the visual object in the folding area, the visual object to an area other than the folding area and display the visual object.

Advantageous Effects

According to various embodiments of the disclosure, an electronic device, which is configured to move, when at least a part of a visual object is located in a folding area of a foldable device, the position of the visual object to an area other than the folding area to allow a user to easily perform interaction with the visual object, may be provided.

According to various embodiments of the disclosure, an electronic device configured to move the position of a visual object located in a first area of a foldable device (e.g., an upper area of the foldable device with reference to a folding axis) to a second area of the foldable device (e.g., a lower area of the foldable device with reference to the folding axis) when the foldable device is folded at a predesignated angle (e.g., 135 degrees) or less may be provided.

Effects according to various embodiments are not limited to the above-mentioned effects, and it is obvious to those skilled in the art that various effects are inherent in the disclosure.

BRIEF DESCRIPTION OF DRAWINGS

FIG. 5A illustrates a visual object to which a position movement function or operation according to an embodiment of the disclosure can be applied.

FIG. 5B illustrates another visual object in accordance with an embodiment of the present disclosure to which a position movement function or operation according to an embodiment of the disclosure can be applied.

FIG. 5C illustrates another visual object in accordance with an embodiment of the present disclosure to which a position movement function or operation according to an embodiment of the disclosure can be applied.

FIG. 5D illustrates another visual object in accordance with an embodiment of the present disclosure to which a position movement function or operation according to an embodiment of the disclosure can be applied.

FIG. 5E illustrates a visual object in accordance with an embodiment of the present disclosure to which a position movement function or operation according to an embodiment of the disclosure may not be applied.

FIG. 5F illustrates another visual object in accordance with an embodiment of the present disclosure to which a position movement function or operation according to an embodiment of the disclosure may not be applied.

FIG. 5G illustrates another visual object in accordance with an embodiment of the present disclosure to which a position movement function or operation according to an embodiment of the disclosure may not be applied.

FIG. 13 illustrates a function or operation by which a visual object according to an embodiment of the disclosure moves from a first area (e.g., an upper-side surface) to a second area (e.g., a lower-side surface) according to folding of a foldable device.

MODE FOR INVENTION

Figure 1:
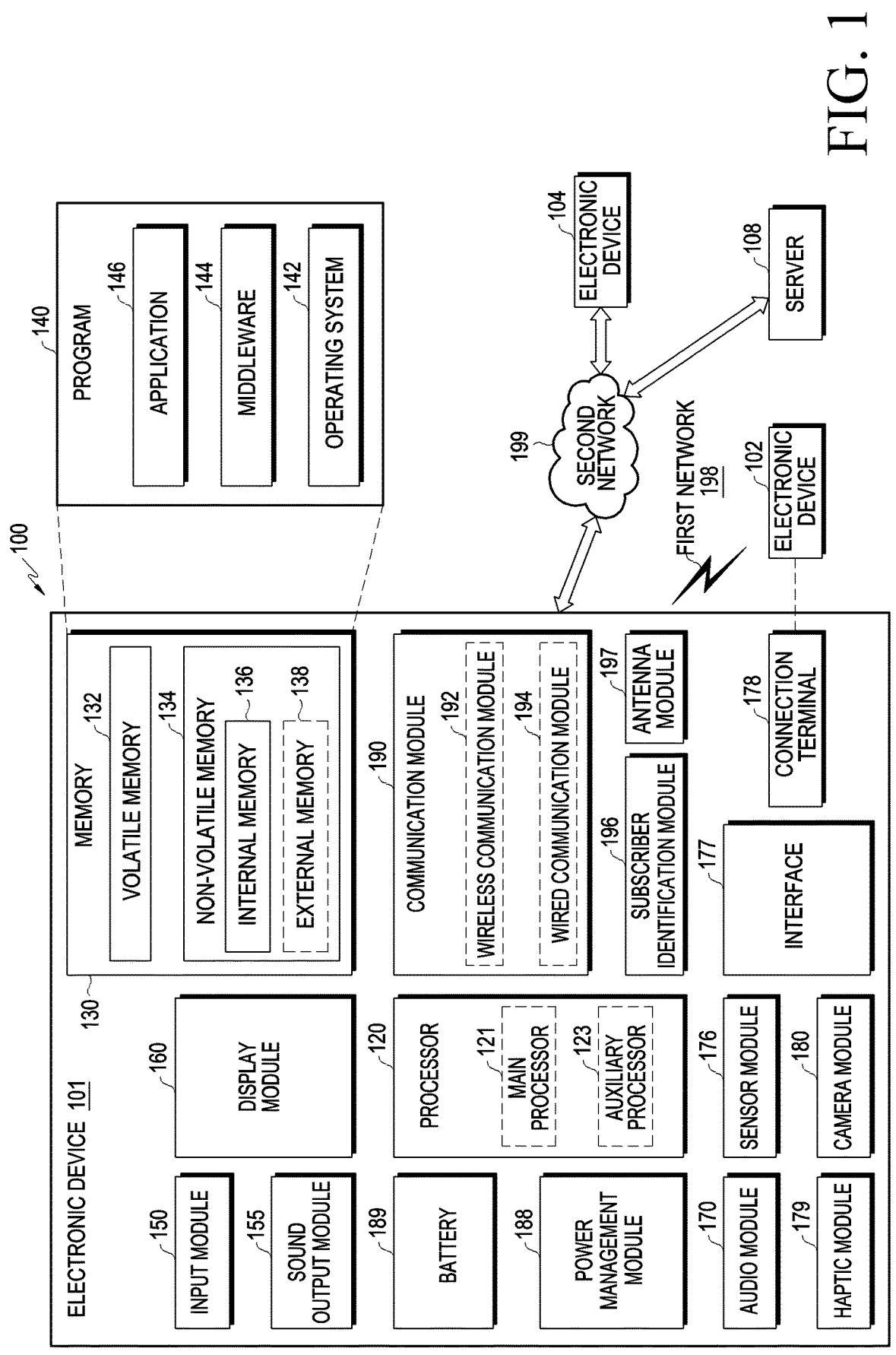
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIGS. 2A-2F illustrate views of an unfolded state of a foldable device 200 according to an embodiment of the disclosure. The foldable device 200 may be an electronic device, such as a smartphone, tablet, or other portable electronic device that has foldable functionality, as described herein.

Referring to FIGS. 2A-2F, the foldable device 200 according to an embodiment of the disclosure may include a first housing 210, a second housing 220, and a flexible or foldable display 230 (hereinafter, briefly, "display 230") (e.g., the display module 160 in FIG. 1) disposed in a space provided by the first housing 210 and the second housing 220. The display 230 includes at least three areas 231a, 231b, 231c that are defined on and by the display 230.

Figure 2A:
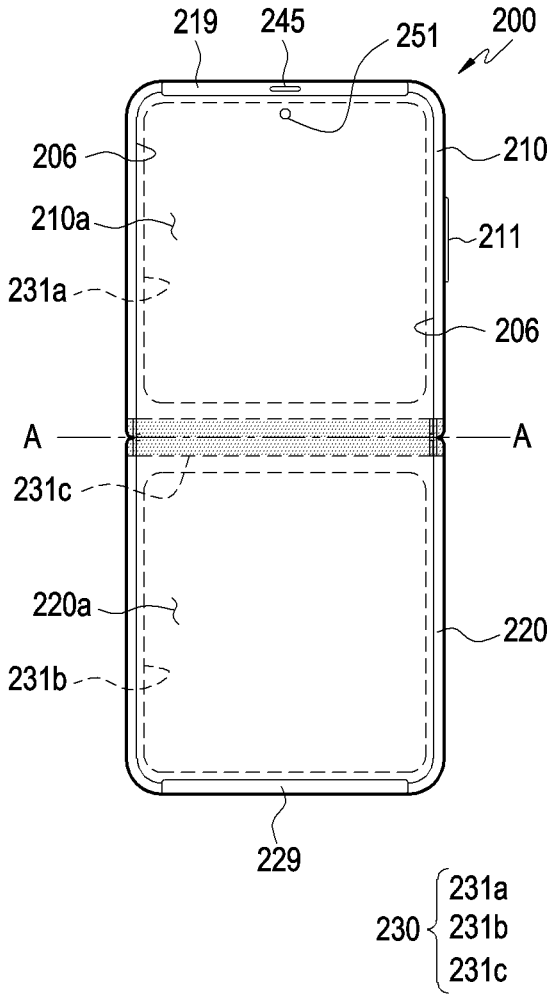
FIG. 2A is front view illustrating an unfolded state of a foldable device according to an embodiment of the disclosure.
Figure 2B:
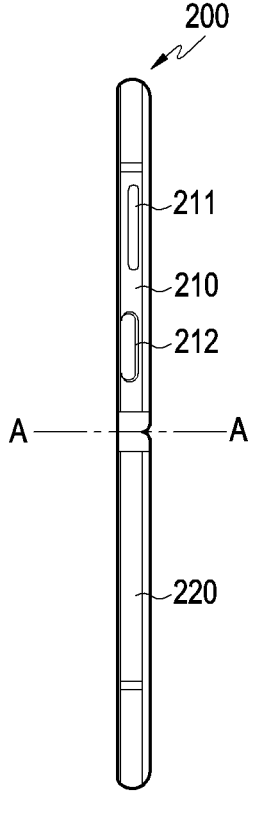
FIG. 2B is a right side view illustrating the foldable device of FIG. 2A.
Figure 2C:
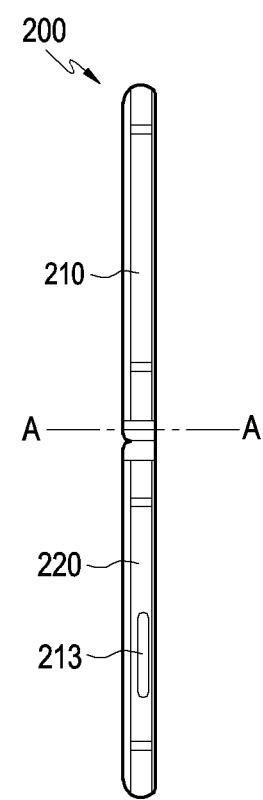
FIG. 2C is a left side view illustrating the foldable device of FIG. 2A.
Figure 2D:
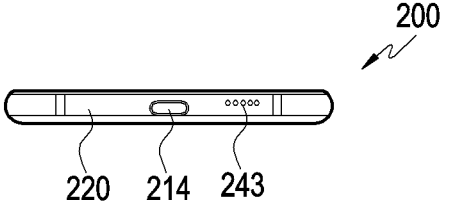
FIG. 2D is a bottom view illustrating the foldable device of FIG. 2A.
Figure 2E:
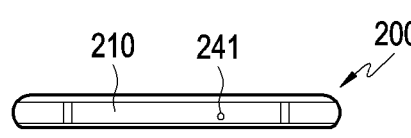
FIG. 2E is a top view illustrating the foldable device of FIG. 2A.
Figure 2F:
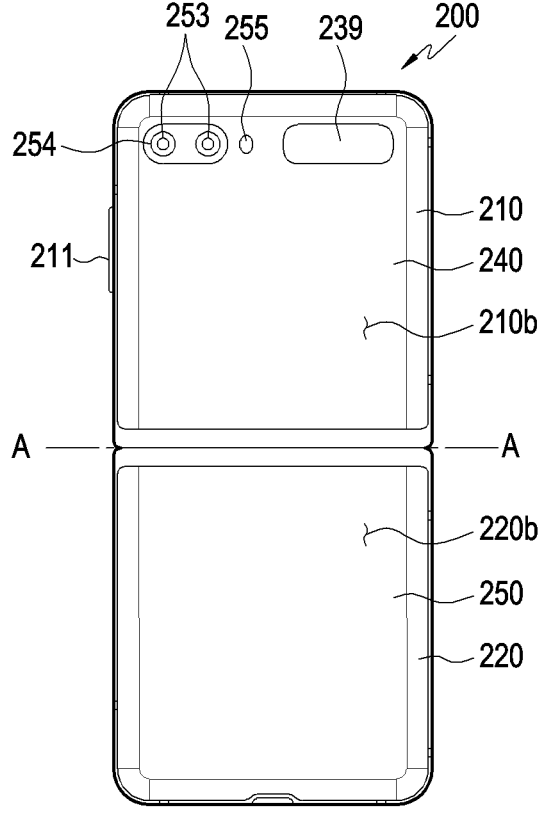
FIG. 2F is a rear view illustrating the foldable device of FIG. 2A.

According to an embodiment of the disclosure, a surface on which the display 230 is disposed may be defined as a front surface of the foldable device 200 (e.g., surface viewed in FIG. 2A). At least a part of the front surface of the foldable device 200 may be formed of a substantially transparent front plate (e.g., a polymer plate or a glass plate including various coated layers). A surface opposite to the front surface may be defined as a rear surface of the foldable device 200 (e.g., surface viewed in FIG. 2F). The rear surface of the foldable device 200 may be formed of a substantially opaque rear plate (hereinafter, referred to as "rear cover"). The rear cover may be formed of, for example, coated or colored glass, ceramic, polymer, plastic, metal (e.g., aluminum, stainless steel (STS), magnesium, etc.), or a combination of at least two of the above-mentioned materials. Furthermore, a surface surrounding the space between the front surface and the rear surface may be defined as a side surface of the foldable device 200 (e.g., surfaces viewed in FIGS. 2B-2E). The side surface may be coupled to the front plate or front surface and the rear cover or rear surface, and may be formed of a side bezel structure (or a "side member"). The side member may be formed from metal and/or polymer or any of the above described materials. In an embodiment, the rear cover and the side bezel structure may include an identical material (e.g., a metal material such as aluminum). In some embodiments, the side surface (e.g., bezel structure) may be integrally formed with, at least, the rear cover to define an interior portion with the front plate for housing components of the foldable device 200.

The foldable device 200 according to an embodiment of the disclosure may include at least one among the display 230, one or more audio modules 241, 243, 245, a sensor module 255, one or more camera modules 253, one or more key input devices 211, 212, 213, and a connector hole 214. According to an embodiment, in the foldable device 200, at least one (e.g., the key input devices 211, 212, 213) of the elements may be omitted, or another element (e.g., a light-emitting element) may be additionally included.

According to an embodiment of the disclosure, the display 230 may be a display, at least a portion of which may be deformed into a flat surface or a curved surface. That is, the display 230 may be a foldable or bendable display. According to an embodiment, the display 230 may include a folding area 231c, a first area 231a disposed at one side (e.g., above the folding area 231c illustrated in FIG. 2A) with reference with the folding area 231c, and a second area 231b disposed at the other side (e.g., below the folding area 231c illustrated in FIG. 2A). It will be appreciated that, the area division of the display 230, illustrated in FIG. 2A, is exemplary, and the display 230 may be divided into multiple (e.g., at least four, or two) areas according to a structure or a function. For example, in the embodiment illustrated in FIGS. 2A-2F, the area of the display 230 may be divided by the folding area 231c or a folding axis A, but in another embodiment, the area of the display 230 may be divided based on another folding area or another folding axis (e.g., a folding axis perpendicular to the folding axis A, or at a different position such that the axis A does not pass through the center or equally divide the first and second areas 231a, 231b). The folding area 231c according to an embodiment of the disclosure may be an area including a specific part of the top surface of the display 230 and a specific part of the bottom surface of the display 230 with reference to the folding axis A. The top surface of the display 230 and the bottom surface of the display 230, according to an embodiment of the disclosure, may be divided based on data obtained by a sensor (e.g., a gyro sensor). The folding area 231*c* according to an embodiment of the disclosure may be an area in which an overlay of a graphic object is prohibited. The folding area 231*c* according to an embodiment of the disclosure may be differently determined depending on an R value inside a hinge of the foldable device 200 and/or the size of the foldable device 200. In an example embodiment of the disclosure, a case in which the coordinates of the upper left end of the folding area 231*c* are set to (0,380) and the coordinates of the lower left end are set to (0,460) may be exemplarily described. In the disclosure, the folding area 231*c* is shown as shaded, but the shading is illustrated as an example to describe the folding area 231*c*. For example, according to an embodiment of the disclosure, the shading indicating the folding area 231*c* may not be displayed when the foldable device 200 is driven.

According to an embodiment of the disclosure, the audio modules 241, 243, 245 may include a microphone hole 241 and speaker holes 243, 245. In the microphone hole 241, a microphone for acquiring an external sound may be disposed, and in an embodiment, multiple microphones may be disposed to detect the direction of a sound. The speaker holes 243, 245 may include an external speaker hole 243 and a receiver hole 245 for a call or the like. In an embodiment, the speaker holes 243, 245 and the microphone hole 241 may be implemented as a single hole, or a speaker may be included without the speaker holes 243, 245 (e.g., a piezo speaker). The position and number of the microphone hole 241 and the speaker holes 243, 245 may be variously changed depending on embodiments and/or configurations of the foldable device 200.

According to an embodiment of the disclosure, the camera module 253 may include a first camera device 251 disposed on a first surface 210*a* of the first housing 210 of the foldable device 200, and a second camera device 254 disposed on a second surface 210*b* of the first housing 210. In addition, the foldable device 200 may further include a flash (not shown). The camera devices 251, 254 may include one or more lenses, an image sensor, and/or an image signal processor. The flash (not shown) may include, for example, a light-emitting diode or a xenon lamp.

According to an embodiment of the disclosure, the sensor module 255 may generate an electrical signal or a data value corresponding to an operation state inside or an environmental state outside the foldable device 200. Although not illustrated in the drawings, the foldable device 200 may additionally or alternatively include one or more additional sensor modules (e.g., the sensor module 176 in FIG. 1) in addition to the sensor module 255 provided on the second surface 210*b* of the first housing 210. The foldable device 200 according to an embodiment of the disclosure may include, as the sensor module, at least one among, for example, a proximity sensor, a fingerprint sensor, a heart rate monitor (HRM) sensor, a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, an angle sensor, an illuminance sensor, or the like. When the foldable device 200 according to an embodiment of the disclosure is in a folded state, the foldable device 200 may distinguish between an upper-side surface and a lower-side surface of the foldable device 200 by using data acquired by a gyro sensor or similar sensor. For example, when data acquired by a gyro sensor is substantially changed from data at a specific time point, the foldable device 200 according to an embodiment of the disclosure may determine that a surface provided with the gyro sensor is the upper-side surface. Conversely, when the data acquired by the gyro sensor is not substantially changed from the data at the specific time point, in the foldable device 200 according to an embodiment of the disclosure may determine that the surface provided with the gyro sensor is the lower-side surface. The foldable device 200 according to an embodiment of the disclosure may determine a folded angle of the foldable device 200 through an angle sensor disposed around the folding axis A. It will be appreciated that, according to various embodiments of the disclosure, other techniques for determining a folded angle or state of the foldable device 200 may be employed without departing from the scope of the present disclosure.

According to an embodiment of the disclosure, the key input devices 211, 212, 213 may be disposed in the side surface of a foldable housing (e.g., the first housing 210 and/or the second housing 220). In another embodiment, the foldable device 200 may not include some or all of the above-mentioned key input devices 211, 212, 213, and other key input devices which are not included in the illustrative foldable device 200 may be implemented in other forms such as a soft key on the display 230. In an embodiment, the key input devices may be configured such that a key input is implemented by a sensor module (e.g., a gesture sensor).

According to an embodiment of the disclosure, the connector hole 214 may be configured to accommodate a connector (e.g., a USB connector) for transmitting and receiving power and/or data to and from an external electronic device, or additionally or alternatively accommodate a connector for transmitting and receiving audio signals to and from an external electronic device.

According to an embodiment of the disclosure, a foldable housing may be implemented by coupling the first housing 210, the second housing 220, a first rear cover 240, a second rear cover 250, and a hinge module. The foldable housing of the foldable device 200 according to an embodiment of the disclosure is not limited to the shape and combination illustrated in FIGS. 2A-2F, and may be implemented by a combination and/or coupling of other shapes or components. For example, in another embodiment, the first housing 210 and the first rear cover 240 may be integrally formed, and the second housing 220 and the second rear cover 250 may be integrally formed. According to various embodiments disclosed in the disclosure, the term "housing" may refer to an element in which various other components, which are not mentioned, are combined and/or coupled. For example, it may be described that a first area 231*a* of the display 230 forms one surface of the first housing 210, and in another embodiment, it may be described the first area 231*a* of the display 230 is disposed on or attached to one surface of the first housing 210.

According to an embodiment of the disclosure, the first housing 210 may be connected to a hinge structure, and may include the first surface 210*a* facing a first direction and the second surface 210*b* facing a second direction opposite to the first direction. The second housing 220 may be connected to the hinge structure, may include a third surface 220*a* facing a third direction and a fourth surface 220*b* facing a fourth direction opposite to the third direction, and may rotate or pivot about the hinge structure (or the folding axis A) with respect to the first housing 210.

According to an embodiment of the disclosure, the first housing 210 and the second housing 220 may be disposed at both sides (upper/lower sides, opposite sides, etc.) about the folding axis A, and may have shapes which are symmetrical as a whole with respect to the folding axis A. An angle and distance formed between the first housing 210 and the second housing 220 may vary depending on a status of the foldable device 200. For example, the foldable device 200 may have an unfolded state, a folded state, and a partially unfolded (or partially folded) intermediate state. According to an embodiment, unlike the second housing 220, the first housing 210 may additionally include various sensors, but may have a shape symmetrical to that of the second housing 220 in other areas.

According to an embodiment of the disclosure, at least a part of the first housing 210 and at least a part of the second housing 220 may be formed of a metal material or a non-metal material having a rigidity of a level selected to support the display 230. The parts formed of the metal material may be provided as a ground plane or a radiating conductor of the foldable device 200, and when provided as a ground plane, may be electrically connected to a ground line formed on a printed circuit board.

According to an embodiment of the disclosure, the first rear cover 240 may be disposed on one side (e.g., an upper side in FIG. 2F) of the folding axis A on the rear surface of the foldable device 200, and may have, for example, a substantially rectangular periphery. The periphery of the first rear cover 240 may be surrounded by the first housing 210 (and/or the side bezel structure). Similarly, the second rear cover 250 may be disposed on the other side (e.g., the lower side in FIG. 2F) of the folding axis A on the rear surface of the foldable device 200. The periphery of the second rear cover 250 may be surrounded by the second housing 220 (and/or the side bezel structure).

According to an embodiment of the disclosure, the first rear cover 240 and the second rear cover 250 may have substantially symmetrical shapes with respect to the folding axis A. It will be appreciated that the first rear cover 240 and the second rear cover 250 do not necessarily require mutually symmetrical shapes. In another embodiment, the foldable device 200 may include the first rear cover 240 and the second rear cover 250, which have various shapes (either symmetrical or non-symmetrical about the folding axis A). In some embodiments, the first rear cover 240 may be formed integrally with the first housing 210, and the second rear cover 250 may be formed integrally with the second housing 220.

According to an embodiment of the disclosure, the first rear cover 240, the second rear cover 250, the first housing 210, and the second housing 220 may form a space in which various components of the foldable device 200 may be disposed. According to an embodiment, one or more components may be disposed or visually exposed on the rear surface of the foldable device 200. For example, at least a part of a sub-display 239 may be visually exposed through the first rear cover 240. In another embodiment, one or more components or sensors may be visually exposed through the first rear cover 240. In various embodiments, the components or sensors may include a proximity sensor, a rear camera, and/or a flash. In addition, although not separately illustrated in the drawings, one or more components or sensors may be visually exposed through the second rear cover 250.

According to an embodiment of the disclosure, a front camera 251 exposed on the front surface the foldable device 200 through at least one opening, or a rear camera 254 exposed through the first rear cover 240 may include one or multiple lenses, an image sensor, and/or an image signal processor. The flash (not shown) may include, for example, a light-emitting diode or a xenon lamp. In an embodiment, at least two lenses (infrared cameras or wide-angle and telephoto lenses) and image sensors may be disposed in one surface of the foldable device 200.

According to an embodiment of the disclosure, the foldable device 200 may change between a folded state and an unfolded state. For example, the first housing 210 and the second housing 220 may rotate with respect to each other about the folding axis A between a first position, in which the first housing 210 and the second housing 220 face each other (folded state), and a second position (e.g., the state illustrated in FIGS. 2A-2F) (flat or open state). In the second position, the first housing 210 and the second housing 220 are unfolded by a designated angle from the first position. In FIGS. 2A-2F, a state in which the first housing 210 and the second housing 220 are unfolded to form an angle of approximately 180 degrees is illustrated (e.g., second position, flat state, open state, etc.). In the first position (e.g., folded state), the first area 231a and the second area 231b of the display 230 are positioned to face each other, and the folding area 231c may be deformed into a curved shape.

According to an embodiment of the disclosure, the foldable device 200 may be implemented by two methods, such as "in-folding", in which the first area 231a and the second area 231b are folded to face each other, and "out-folding", in which the first area 231a and the second area 231b are folded to face directions opposite to each other. For example, in a folded state based on the in-folding method, the first area 231a and the second area 231b may be substantially hidden. In a completely unfolded status (second position, open state, etc.), the first area 231a and the second area 231b may be disposed to face a substantially identical direction. In another example, in a folded state based on the out-folding method, the first area 231a and the second area 231b may be disposed to face opposite directions and exposed outside, and in a completely unfolded state, the first area 231a and the second area 231b may disposed to face a substantially identical direction.

According to an embodiment of the disclosure, the display 230 may include a display panel and window member, and may be formed of a flexible material. Although not illustrated separately, those skilled in the art may easily understand that the display 230 or the display panel may include various layer(s), such as a light-emitting layer, a substrate(s) encapsulating the light-emitting, an electrode or wiring layer, and/or an adhesive layer(s) bonding different layers adjacent to each other. According to an embodiment of the disclosure, when the display 230 (e.g., the folding area 231c) is deformed in a flat shape or a curved shape, relative displacement may occur between layers constituting the display 230. The relative displacement according to the deformation of the display 230 may increase at a point farther from the folding axis A and/or as the thickness of the display 230 increases.

According to an embodiment of the disclosure, the window member may function as a protective film for protecting the display panel. For a thin plate as the protective film, a material which protects the display panel from external impact, is resistant to scratches, and reduces the occurrence of wrinkles in the folding area 231c even in repeated folding and unfolding of the housings 210 and 220 may be used. For example, the material of the thin film plate may include a clear polyimide (CPI) or ultra-thin glass (UTG).

According to various embodiments, the foldable device 200 may further include a protective member 206 (protective members) and/or one or more decorative covers 219, 229 disposed on at least a part of the edge of the display 230 on the front surface (e.g., the first surface 210a and/or the third surface 220a). The protective member 206 or the decoration covers 219, 229 may prevent at least part of the edge of the display 230 from being brought into contact with a mechanical structure (e.g., the first housing 210 or the second housing 220), and may provide a decorative effect or aesthetic on the exterior of the foldable device 200.

Figure 3:
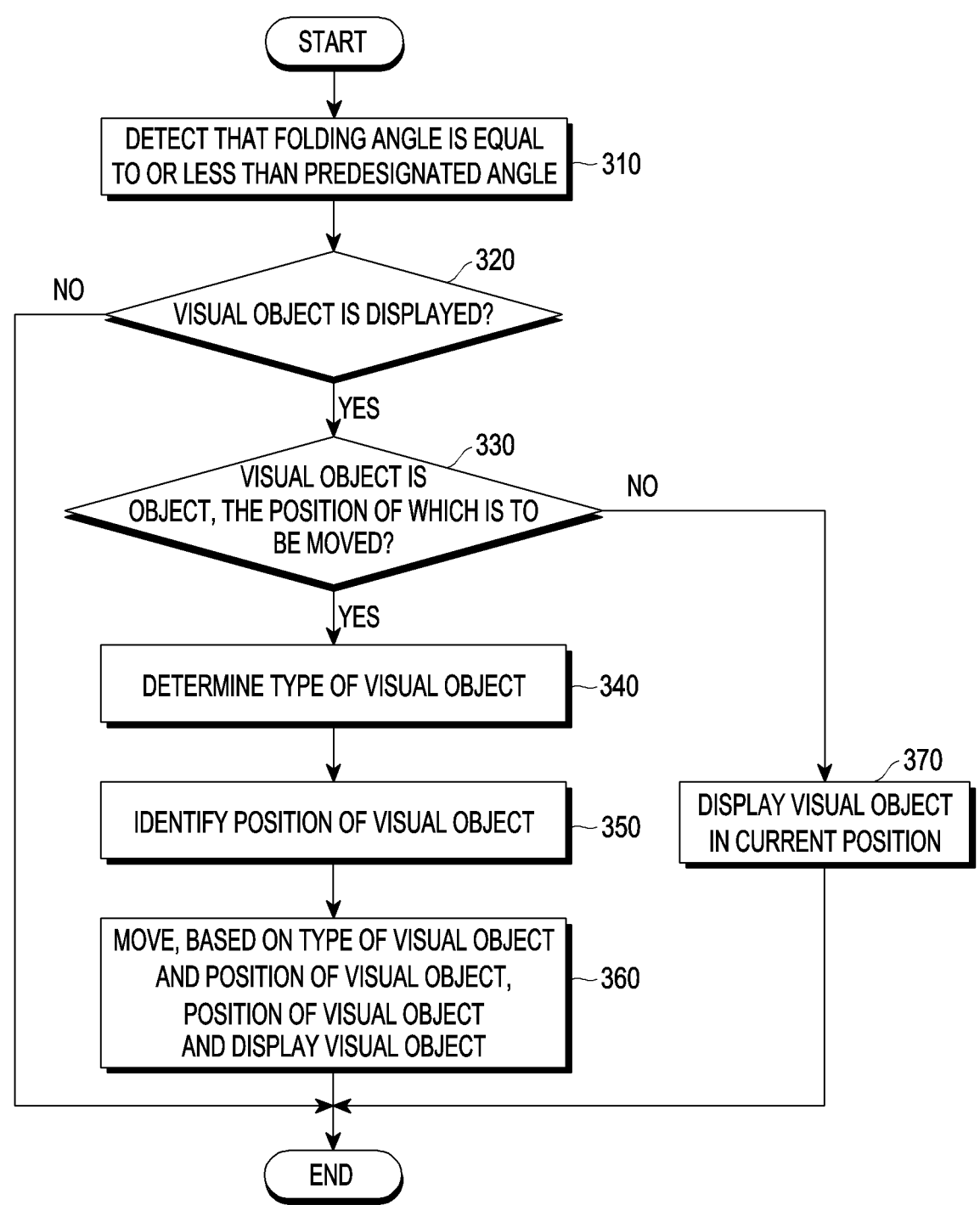
FIG. 3 illustrates a function or operation of moving a position of a visual object located in a folding area in a foldable device according to an embodiment of the disclosure.
Figures 4A, 4B:
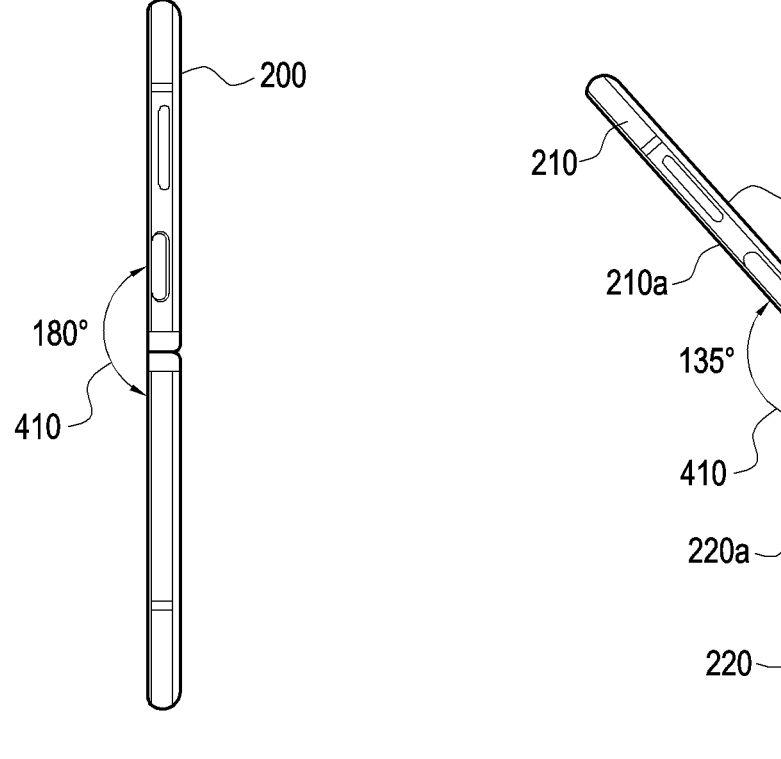
FIG. 4A illustrates a folding angle of a foldable device according to an embodiment of the disclosure.
FIG. 4B illustrates another folding angle of the foldable device of FIG. 4A.
Figure 6:
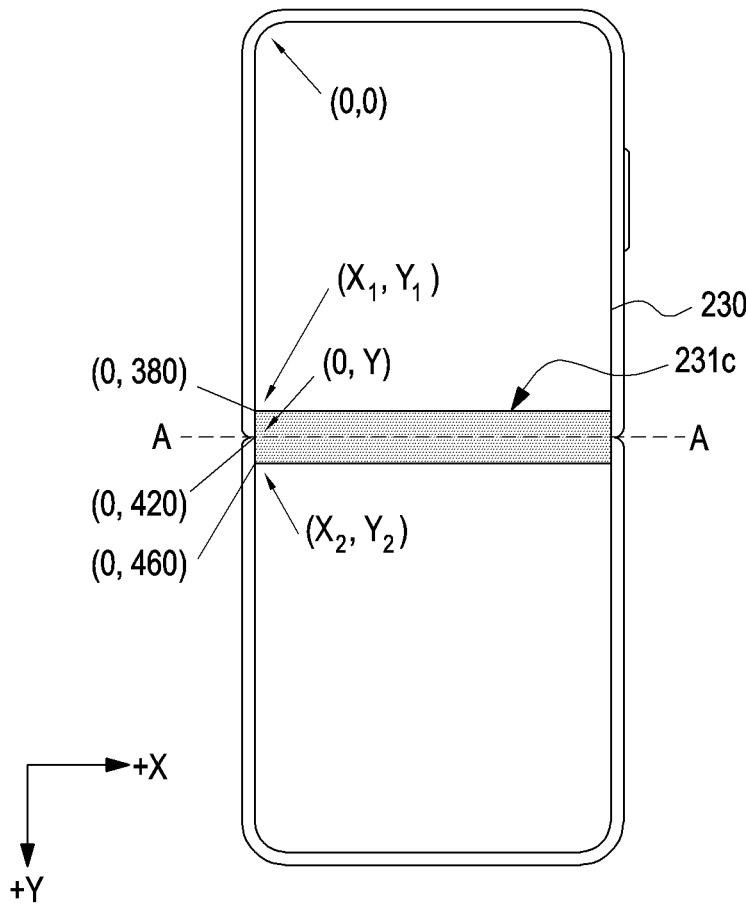
FIG. 6 illustrates coordinates that are set in a foldable device in order to apply a position movement function or operation according to an embodiment of the disclosure to a visual object.
Figure 7A:
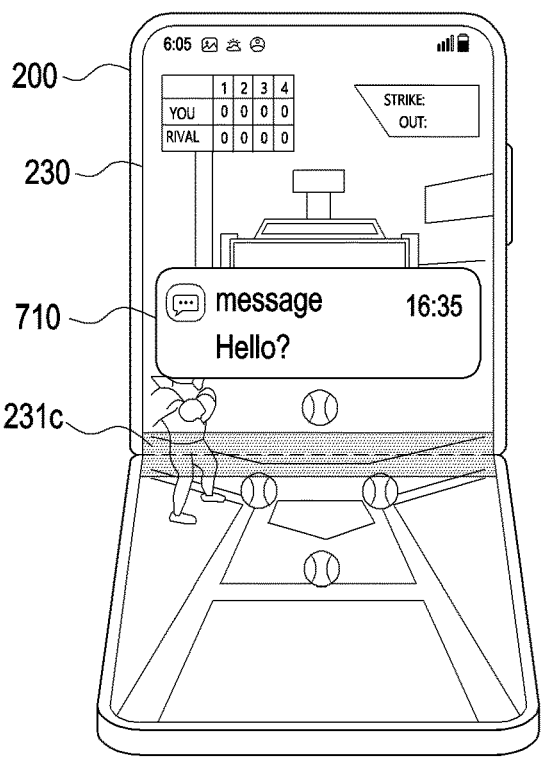
FIG. 7A illustrates an embodiment in which, when a visual object according to an embodiment of the disclosure is a first type object (e.g., an object having a fixed position value), a position movement function or operation according to an embodiment of the disclosure is applied to the visual object.
Figure 7B:
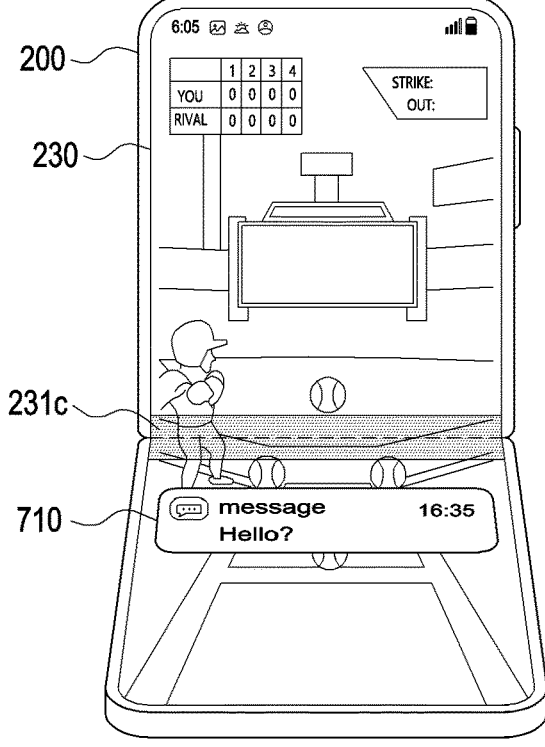
FIG. 7B illustrates an alternative position of the object shown in FIG. 7A.
Figure 7C:
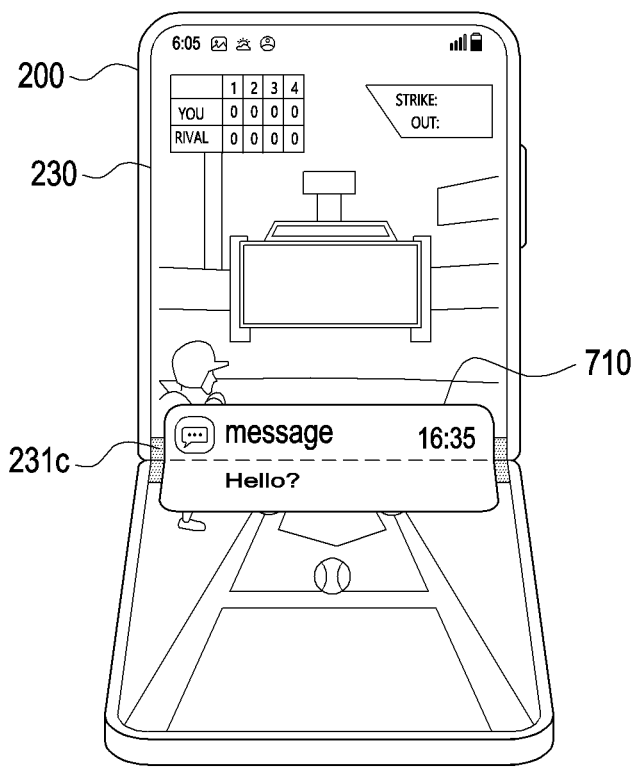
FIG. 7C illustrates another alternative position of the object shown in FIG. 7A.
Figure 7D:
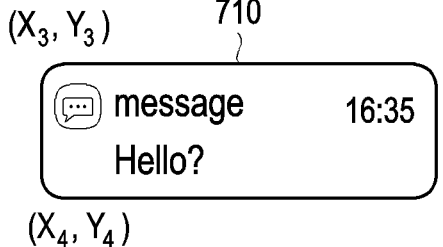
FIG. 7D illustrates the object of FIGS. 7A-7C in isolation.
Figure 7E:
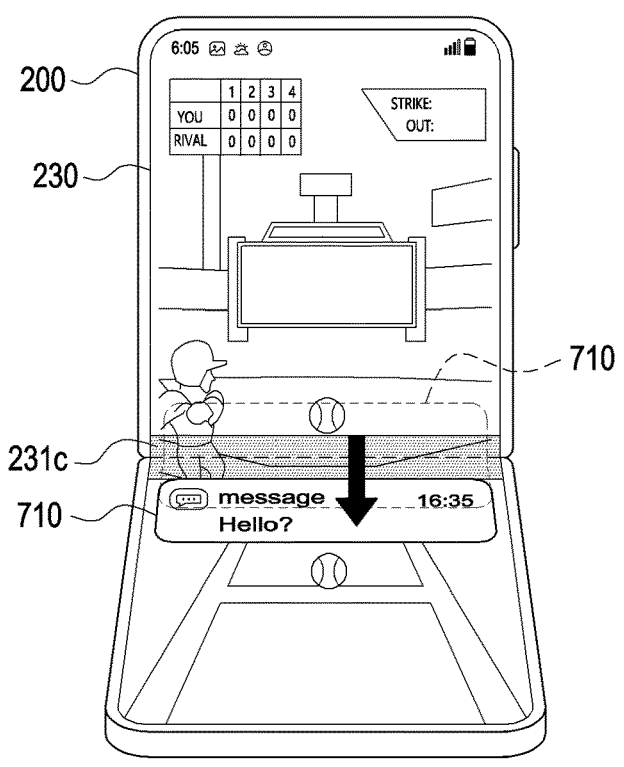
FIG. 7E illustrates one movement of the object of FIGS. 7A-7D.
Figure 7F:
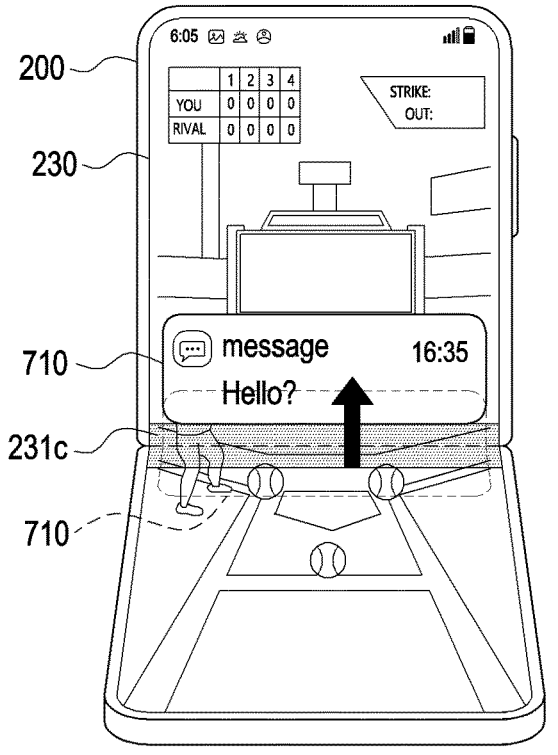
FIG. 7F illustrates another movement of the object of FIGS. 7A-7D
Figure 8A:
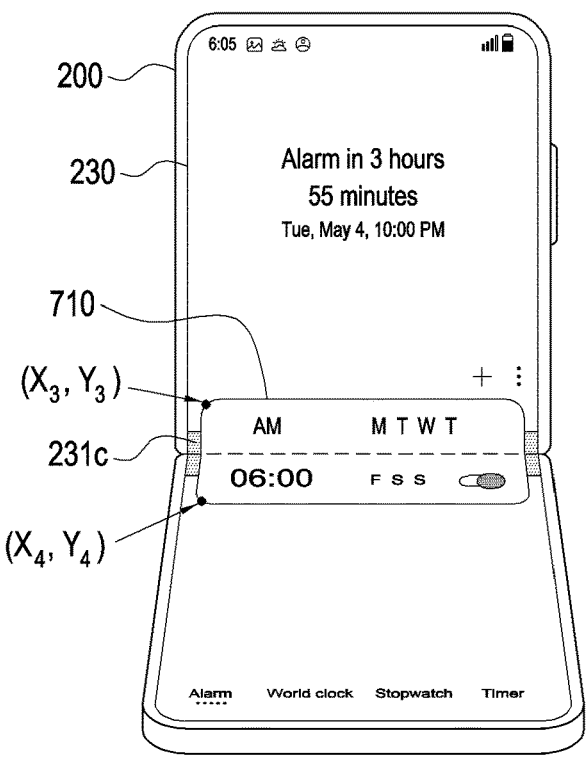
FIG. 8A illustrates an embodiment in which, when a visual object according to an embodiment of the disclosure is a second type object (e.g., an object having a relative position value) and when the visual object is located on a folding axis A, a position movement function or operation according to an embodiment of the disclosure is applied to the visual object.
Figure 8B:
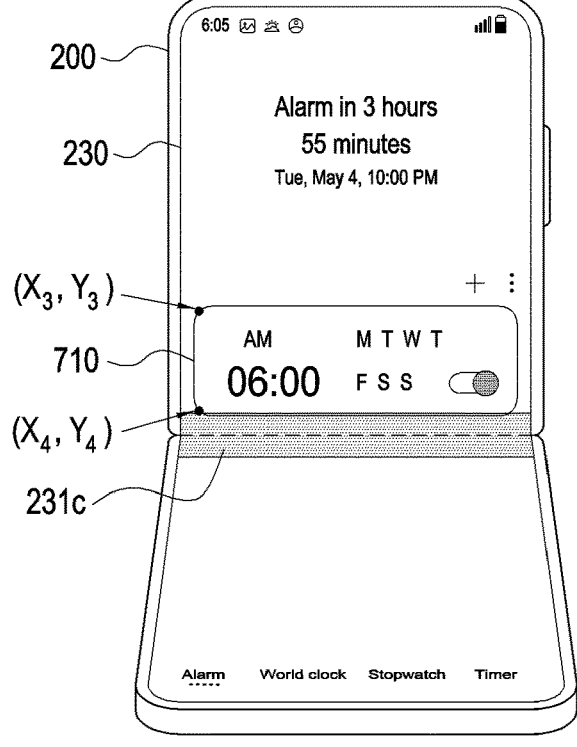
FIG. 8B illustrates the object of FIG. 8A moved from the folding axis.
Figure 8C:
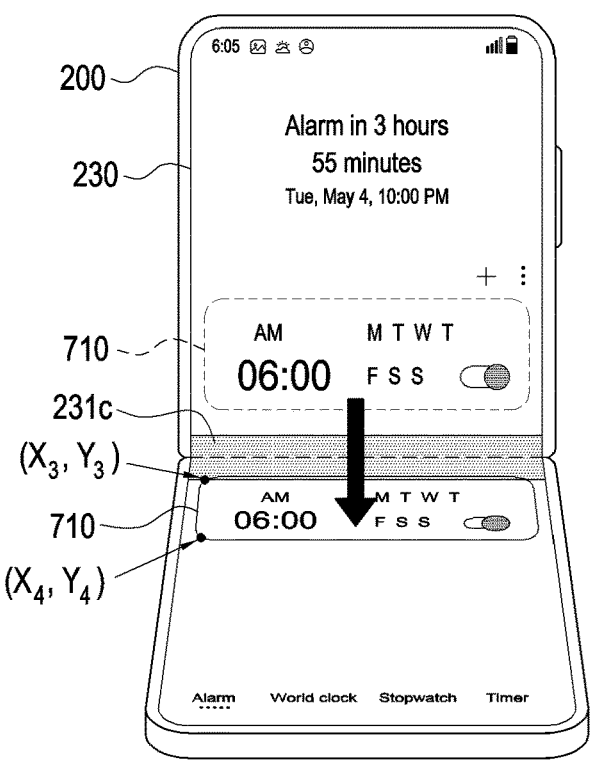
FIG. 8C illustrates a movement of the object of FIG. 8B to another position.
Figure 9A:
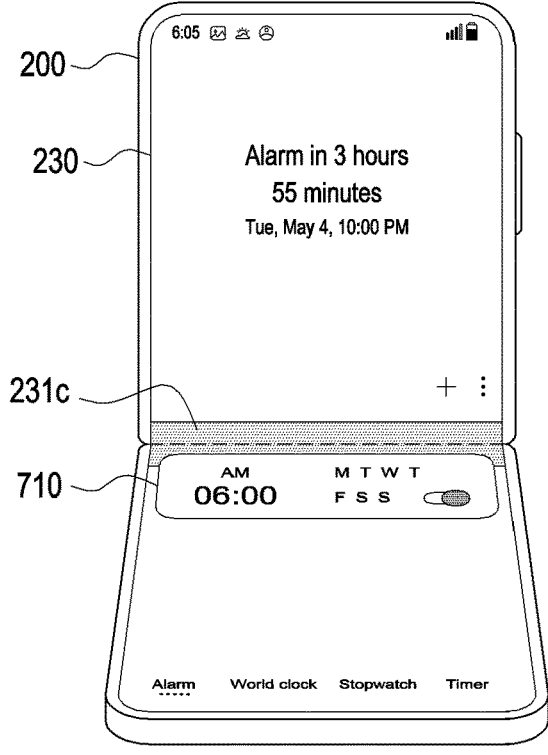
FIG. 9A illustrates an embodiment in which, when a visual object according to an embodiment of the disclosure is a second type object (e.g., an object having a relative position value), and when the visual object is not located on a folding axis A but is located in a folding area, a position movement function or operation according to an embodiment of the disclosure is applied to the visual object.
Figure 9B:
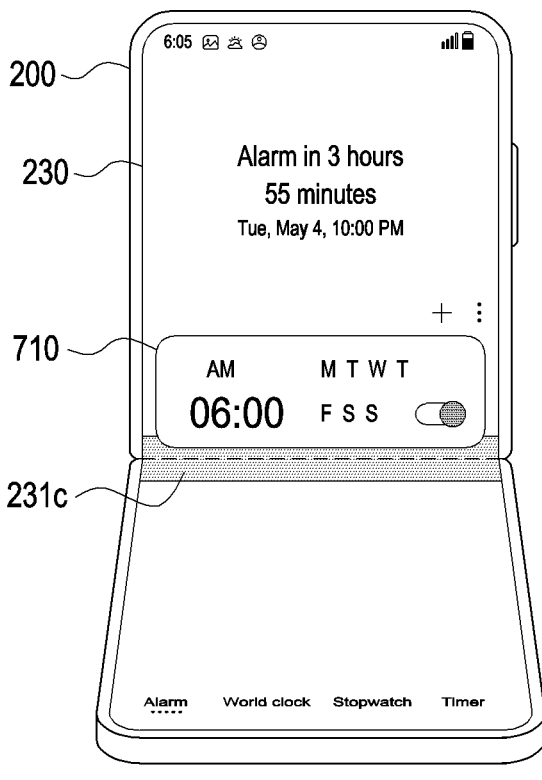
FIG. 9B illustrates an moved position of the object of FIG. 9A.
Figure 9C:
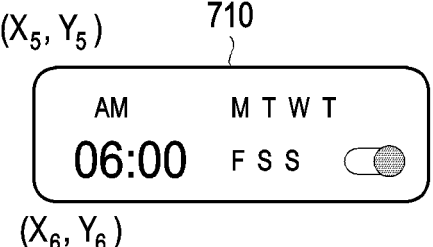
FIG. 9C illustrates the object of FIGS. 9A-9B in isolation.

FIG. 3 is an illustration of a function or operation of moving a position of a visual object located in a folding area in a foldable device according to an embodiment of the disclosure. FIGS. 4A and 4B are exemplary views illustrating a folding angle of a foldable device according to an embodiment of the disclosure. FIGS. 5A to 5G are exemplary views illustrating visual objects to which a position movement function or operation according to an embodiment of the disclosure may be applied or visual objects to which a position movement function or operation according to an embodiment of the disclosure is not applied. FIG. 6 illustrates a coordinate system of a foldable device in order to apply a position movement function or operation to a visual object according to an embodiment of the disclosure. FIGS. 7A to 7F are views illustrating an embodiment in which, when a visual object according to an embodiment of the disclosure is a first type object (e.g., an object having a fixed position value), a position movement function or operation according to an embodiment of the disclosure is applied to the visual object. FIGS. 8A to 8C are views illustrating an embodiment in which, when a visual object according to an embodiment of the disclosure is a second type object (e.g., an object having a relative position value) and when the visual object is located on a folding axis A, a position movement function or operation is applied to the visual object according to an embodiment of the disclosure. FIGS. 9A to 9C are views illustrating an embodiment in which, when a visual object according to an embodiment of the disclosure is a second type object (e.g., an object having a relative position value), and when the visual object is not located on a folding axis A but is located in a folding area, a position movement function or operation is applied to the visual object according to an embodiment of the disclosure. FIGS. 10A to 10F are views illustrating an embodiment in which, when a visual object according to an embodiment of the disclosure is a second type object (e.g., an object having a relative position value) and when multiple visual objects are displayed, a position movement function or operation is applied to the visual object according to an embodiment of the disclosure. FIGS. 11A to 11C are views illustrating an embodiment in which, when a visual object according to an embodiment of the disclosure is a second type object (e.g., an object having a relative position value) and when a user input is received, a position movement function or operation is applied to the visual object according to an embodiment of the disclosure. FIGS. 12A to 12D are exemplary views illustrating an embodiment in which, when a visual object according to an embodiment of the disclosure is a floating button or an edge button, a position movement function or operation is applied to the visual object according to an embodiment of the disclosure.

With reference to the above described figures, in operation 310 shown in FIG. 3, the foldable device 200 according to an embodiment of the disclosure may detect that a folding angle 410 is equal to or less than a predesignated angle. The foldable device 200 according to an embodiment of the disclosure may use an angle sensor provided in the foldable device 200 to detect that the folding angle 410 is equal to or less than the predesignated angle. According to various embodiments of the disclosure, various techniques for detecting the angle of the foldable device 200 may be used to detect that the folding angle 410 is equal to or less than the predesignated angle. Referring to FIG. 4A, an angle when the foldable device 200 according to an embodiment of the disclosure is substantially completely unfolded may be defined as 180 degrees. Referring to FIG. 4B, the folding angle 410 of the foldable device 200 according to an embodiment of the disclosure may be defined as an angle formed by the first housing 210 and the second housing 220 or an angle formed by the first surface 210a and the third surface 220a. The predesignated angle according to an embodiment of the disclosure may be, for example, 135 degrees, but this is merely for example, and a predesignated angle may be any desired angle that may be based, in part, on the structure and configuration of the foldable device.

In operation 320, the foldable device 200 according to an embodiment of the disclosure may determine whether a visual object (e.g., visual object 710) is displayed when the folding angle 410 is equal to or less than the predesignated angle. The visual object according to an embodiment of the disclosure may include various objects including, but not limited to, icons, box-shaped buttons, box-shape switches, text buttons, pop-up windows, interactional elements, (e.g., a graphic element configured to provide a specific object or content according to the reception of a touch input), or other element or object that may be displayed on a screen of the foldable device 200. According to an embodiment of the disclosure, the order of performing operations 310 and 320 may be changed (e.g., reversed or may be performed simultaneously). If the visual object is not displayed, at operation 320, then the operation completes or ends.

In response to determining that a visual object is displayed (operation 320) and the folding angle is equal to or less than the predesignated angle (operation 31), in operation 330, the foldable device 200 according to an embodiment of the disclosure may determine whether the visual object is an object to which a position movement function or operation can be applied. For example, the foldable device 200 according to an embodiment of the disclosure may determine whether the visual object is a graphic object including an icon, a box-shaped button or a box-shape switch, a text button, a pop-up window, or an interactional element (e.g., a graphic element configured to provide a specific object or content according to the reception of a touch input). FIGS. 5A to 5D illustrate examples of visual objects to which a position movement function or operation can be applied. For example, as illustrated in FIG. 5A, when the visual object is an icon 510, a position movement function or operation according to an embodiment of the disclosure may be applied thereto. As illustrated in FIG. 5B, when the visual object is a box-shaped object 520 including a switch 522 configured to receive a specific input from a user, a position movement function or operation according to an embodiment of the disclosure may be applied thereto. As illustrated in FIG. 5C, when the visual object is a text button 530 (e.g., a virtual button), a position movement function or operation according to an embodiment of the disclosure may be applied thereto. As illustrated in FIG. 5D, when the visual object is a box-shaped interactional element 540 including an interactional element (e.g., a video playback button 542), a position movement function or operation according to an embodiment of the disclosure may be applied thereto. Furthermore, the visual object, to which a position movement function or operation according to an embodiment of the disclosure can be applied, may be an object including a button, an input element, and/or an interaction area, requiring a user's control, and may include a distinguishable and/or separable user interface. For example, when the foldable device 200 (e.g., the processor 120) according to an embodiment of the disclosure determines a code of the visual object, the visual object may be an object including an interaction area, and when it is determined by the code of the visual object that the visual object is designated as an independent object indicating a "button" and/or a "pop-up", the position movement function or operation according to an embodiment of the disclosure may be applied to the above-mentioned visual object.

In contrast, for example, as illustrated in FIG. 5E, the position movement function or operation according to an embodiment of the disclosure may not be applied to a visual object (e.g., a list 550) in which multiple objects (e.g., lines or items constituting the list 550 in FIG. 5E) themselves are displayed as a single object and not as visually separated objects. Furthermore, for example, as illustrated in FIGS. 5F and 5G, the position movement function or operation according to an embodiment of the disclosure may not be applied to a visual object (e.g., one screen 560 on which text and images are combined, or a captured screen 570 including a specific image (e.g., a graph)) in which multiple types of objects (e.g., text and images, text and hyperlinks) themselves are displayed as a single object and which does not including a graphic object (e.g., does not include the video playback button 542) for receiving a user input. The foldable device 200 according to an embodiment of the disclosure may parse data of the visual object to determine whether multiple objects are objects which are visually or spatially separated and displayed, or objects which themselves are displayed as a single object.

In operation 330, if the visual object is not one that may not be moved, the process may proceed to operation 370 and display the visual objection in the current position.

In operation 340, the foldable device 200 according to an embodiment of the disclosure may determine the type of the visual object when it is determined that the visual object (e.g., visual object 710) is an object to which the position movement function or operation can be applied (i.e., "yes" at operation 330). For example, the foldable device 200 according to an embodiment of the disclosure may determine whether the visual object is a first type object displayed in a predesignated fixed position on the flexible display 230, or a second type object in which the position of display of the visual object is changeable on the flexible display 230. The first type object according to an embodiment of the disclosure may be an object in which the position of display of the visual object is not changed on the flexible display 230 depending on the occurrence of an event (e.g., display of another visual object, or reception of a user gesture (e.g., a drag gesture) for the visual object). The second type object according to an embodiment of the disclosure may be an object in which the position of display of the visual object is changed on the flexible display 230 depending on the occurrence of an event (e.g., display of another visual object, or reception of a user gesture (e.g., a drag gesture) for the visual object). In the present disclosure, the wording "first type object" may be referred to as an "object having a fixed position value", and the wording "second type object" may be referred to as an "object having a relative position value".

After determining the type of visual object (operation 340), in operation 350, the foldable device 200 according to an embodiment of the disclosure may identify the position of the visual object. For example, referring to FIG. 6, in order to identify the position of the visual object, the foldable device 200 according to an embodiment of the disclosure may configure virtual coordinates in which a top left end/ corner is the origin (0, 0) and coordinates of the folding axis A are (0,Y). According to an embodiment of the disclosure, a Y value of the folding axis A may be, for example, 420. The foldable device 200 according to an embodiment of the disclosure may determine, based on the configured virtual coordinates, whether the visual object 710 identified as a first type object is located outside the folding area 231$c$ (e.g., as illustrated in FIGS. 7A and 7B), or whether at least a part of the visual object 710 is located inside or overlaps with the folding area 231$c$ (e.g., as illustrated in FIG. 7C). For example, when coordinates of the folding area 231$c$ are configured to be, for example, $(X_1, 380)$ and $(X_2, 460)$ as illustrated in FIG. 6, the foldable device 200 according to an embodiment of the disclosure may compare the coordinates $(X_3, Y_3)$ and $(X_4, Y_4)$ of the visual object 710 as illustrated in FIG. 7D with the coordinates of the folding area 231$c$ to determine whether the visual object 710 is located outside the folding area 231$c$ or whether the visual object 710 is located inside the folding area 231$c$. For example, when the coordinates $(X_3, Y_3)$ and $(X_4, Y_4)$ of the visual object 710 are (0, 200) and (0, 300), respectively, the foldable device 200 according to an embodiment of the disclosure may identify that the visual object 710 is located outside the folding area 231$c$. Likewise, when the coordinates $(X_3, Y_3)$ and $(X_4, Y_4)$ of the visual object 710 are (0, 400) and (0, 500), the foldable device 200 according to an embodiment of the disclosure may identify that at least a part of the visual object 710 is located inside the folding area 231$c$. The foldable device 200 according to an embodiment of the disclosure may compare the coordinates of the visual object with the coordinates of the folding area. Accordingly, the foldable device 200 according to an embodiment of the disclosure may correct or adjust a position value of the visual object 710 when the Y value $Y_3$ of a left upper end of the visual object 710 is smaller than a Y value (e.g., 420) of the coordinate values of the folding axis A and left lower end Y value $Y_4$ is greater than the Y value (e.g., 420) of coordinate values (0, 420) of the folding axis A (e.g., when the visual object is positioned over a portion of the folding axis A). FIG. 7A illustrates an embodiment in which the visual object 710 is displayed on an execution screen of a specific application (e.g., a game application).

In operation 360, the foldable device 200 according to an embodiment of the disclosure may move or adjust the position of the visual object 710, based on the type of the visual object 710 and the position of the visual object 710, and display the visual object 710 at the new or adjusted position. According to an embodiment of the disclosure, when the visual object 710 is identified as the first type object, the visual object 710 may be moved in one predetermined direction (e.g., downward or toward the lower side of the foldable device 200). As described later, according to an embodiment of the disclosure, when the visual object 710 is identified as the second type object, the visual object 710 may be moved in a first direction (e.g., downward or toward the lower side of the foldable device 200) or in a second direction (e.g., upward or toward the upper side of the foldable device 200). When both the coordinates $Y_3$ and $Y_4$ of the visual object 710 are smaller than the Y value (e.g., 420) of the folding axis A, the foldable device 200 according to an embodiment of the disclosure may calculate a difference between $Y_3$ and a $Y_2$ value of the folding area 231$c$, and, as illustrated in FIG. 7E, may move the visual object 710 downward by the calculated difference. When the coordinate $Y_3$ of the visual object 710 is smaller than the Y value (e.g., 420) of the folding axis A and when $Y_4$ is greater than the Y value (e.g., 420) of the folding axis A, the foldable device 200 according to an embodiment of the disclosure may calculate a difference between $Y_3$ and the $Y_2$ value of the folding area 231*c*, and, as illustrated in FIG. 7E, may move the visual object 710 downward by the calculated difference. When both the coordinates $Y_3$ and $Y_4$ of the visual object 710 are equal to or greater than the Y value (e.g., 420) of the folding axis A, the foldable device 200 according to an embodiment of the disclosure may not move the position of the visual object 710 if ① $Y_3 - Y_2 = 0$, may not move the position of the visual object 710 if ② $Y_3 - Y_2 > 0$, and may add, if ③ $Y_3 - Y_2 < 0$, $|Y_3 - Y_2|$ to each Y value (e.g., $Y_3$, $Y_4$) of the visual object 710 to move the visual object 710 in the first direction (e.g., the downward direction). According to an embodiment of the disclosure, when the predesignated direction or a direction configured by a user is an upward direction, the foldable device 200 may move the position of the visual object 710 in the second direction (e.g., the upward direction) as illustrated in FIG. 7F. For example, when both the coordinates $Y_3$ and $Y_4$ of the visual object 710 are smaller than the Y value (e.g., 420) of the folding axis A, the visual object 710 is displayed on the upper-side surface (e.g., the first surface 210*a*) of the foldable device 200, and thus the foldable device 200 according to an embodiment of the disclosure may maintain the position of the visual object 710. When the coordinate $Y_3$ of the visual object 710 is smaller than the Y value (e.g., 420) of the folding axis A and when $Y_4$ is greater than the Y value (e.g., 420) of the folding axis A, the foldable device 200 according to an embodiment of the disclosure may calculate a difference between $Y_4$ and a $Y_1$ value of the folding area 231*c*, and, as illustrated in FIG. 7F, may move the visual object 710 upward by the calculated difference. When both the coordinates $Y_3$ and $Y_4$ of the visual object 710 is equal to or greater than the Y value (e.g., 420) of the folding axis A, the foldable device 200 according to an embodiment of the disclosure may move, as illustrated in FIG. 7F, the position of the visual object 710 such that the coordinate of $Y_4$ becomes 380.

As illustrated in FIGS. 8A to 8C, when the visual object 710 is a second type object (e.g., an object having a relative position value) and when at least a part of the visual object 710 is located on the folding axis A, the foldable device 200 according to an embodiment of the disclosure may compare results of $|Y_3 - 420|$ and $|Y_4 - 420|$. ① In case of $|Y_3 - 420| > |Y_4 - 420|$, the foldable device 200 according to an embodiment of the disclosure may move, as illustrated in FIG. 8B, the visual object 710 in a first direction (e.g., toward the upper-side surface of the foldable device 200) and display the visual object 710. In this case, the visual object 710 may be moved by the difference between that $Y_4$ and the $Y_1$ value of the folding area 231*c*. ② In case of $|Y_3 - 420| = |Y_{4-420}|$, the foldable device 200 according to an embodiment of the disclosure may move, as illustrated in FIG. 8C, the visual object 710 in a second direction (e.g., toward the lower-side surface of the foldable device 200) and display the visual object 710. In this case, the visual object 710 may be moved by the difference between $Y_3$ and the $Y_2$ value of the folding area 231*c*. However, in case of $|Y_{3-420}| = |Y_4 - 420|$, the visual object 710 may move in the second direction according to a user setting or a manufacturer setting. ③ In case of $|Y_3 - 420| < |Y_4 - 420|$, the foldable device 200 according to an embodiment of the disclosure may move, as illustrated in FIG. 8C, the visual object 710 in the second direction (e.g., toward the lower-side surface of the foldable device 200) and display the visual object 710. In this case, the visual object 710 may be moved by the difference between $Y_3$ and the $Y_2$ value of the folding area 231*c*.

Referring to FIGS. 9A to 9C, as illustrated in FIGS. 9A and 9B, when the visual object 710 is a second type object (e.g., an object having a relative position value) and when at least a part of the visual object 710 is included in the folding area 231*c*, the foldable device 200 may compare $Y_5$ and $Y_2$ (e.g., when the visual object 710 is located on the lower-side surface as illustrated in FIG. 9A), or may compare $Y_6$ and $Y_1$ (e.g., when the visual object 710 is located on the upper-side surface as illustrated in FIG. 9B). ① In case of $Y_5 - Y_2 = 0$ and $Y_5 - Y_2 > 0$, the foldable device 200 according to an embodiment of the disclosure may maintain the position of the visual object 710, and ② in case of $Y_5 - Y_2 < 0$, the foldable device 200 may add $|Y_5 - Y_2|$ to each Y value of the visual object 710 to move the visual object 710 in a first direction (e.g., a downward direction). ① In case of $Y_6 - Y_1 = 0$ and $Y_6 - Y_1 < 0$, the foldable device 200 according to an embodiment of the disclosure may maintain the position of the visual object 710, and ② in case of $Y_6 - Y_1 > 0$, the foldable device 200 may move the visual object 710 in a second direction (e.g., the upper-side surface) by subtracting $Y_6 - Y_1$ from each Y value (e.g., $Y_5$, $Y_6$) of the visual object 710.

Figure 10A:
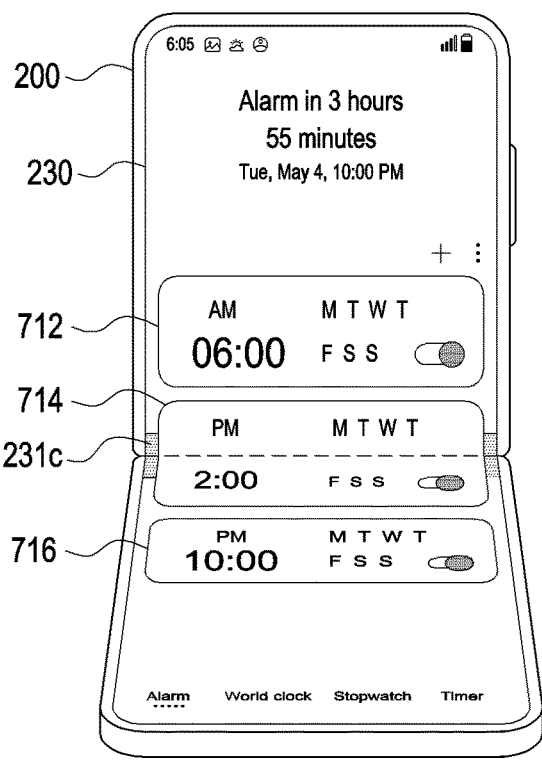
FIG. 10A illustrates an embodiment in which, when a visual object according to an embodiment of the disclosure is a second type object (e.g., an object having a relative position value) and when multiple visual objects are displayed, a position movement function or operation according to an embodiment of the disclosure is applied to the visual object.
Figure 10B:
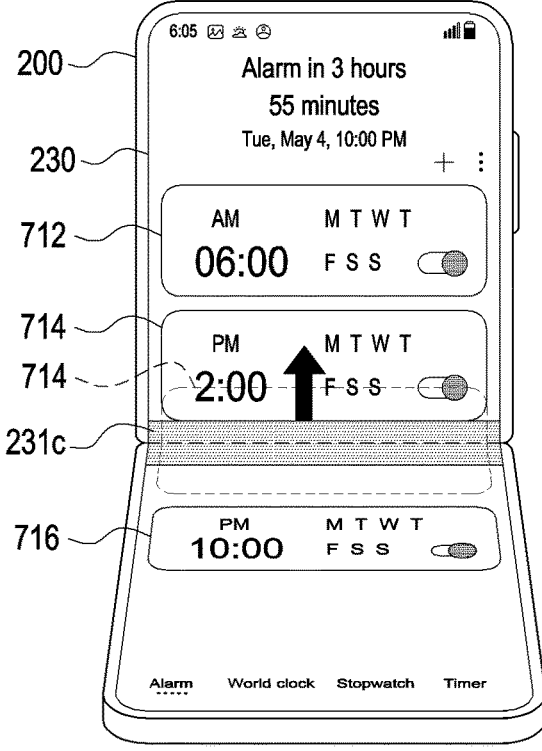
FIG. 10B illustrates the object of FIG. 10A being moved in a first direction.
Figure 10C:
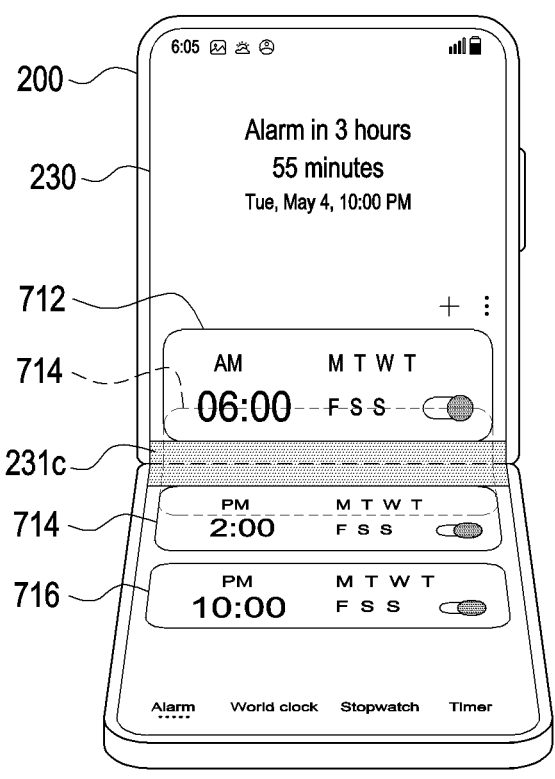
FIG. 10C illustrates the object of FIG. 10A being moved in a second direction.
Figure 10D:
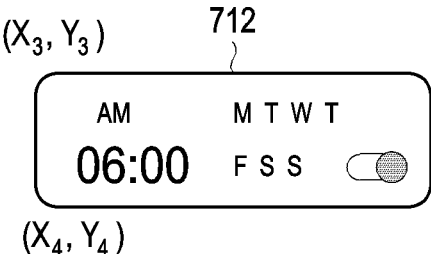
FIG. 10D illustrates the object of FIG. 10A at a first coordinate position.
Figure 10E:
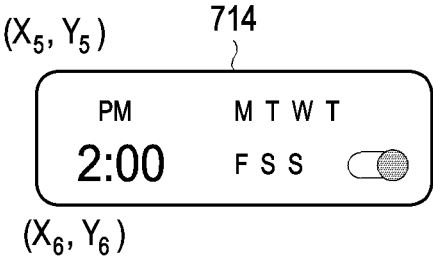
FIG. 10E illustrates the object of FIG. 10A at a second coordinate position.
Figure 10F:
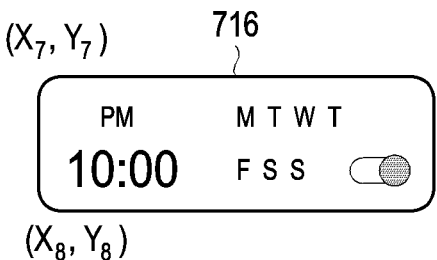
FIG. 10F illustrates the object of FIG. 10A at a third coordinate position.
Figure 11A:
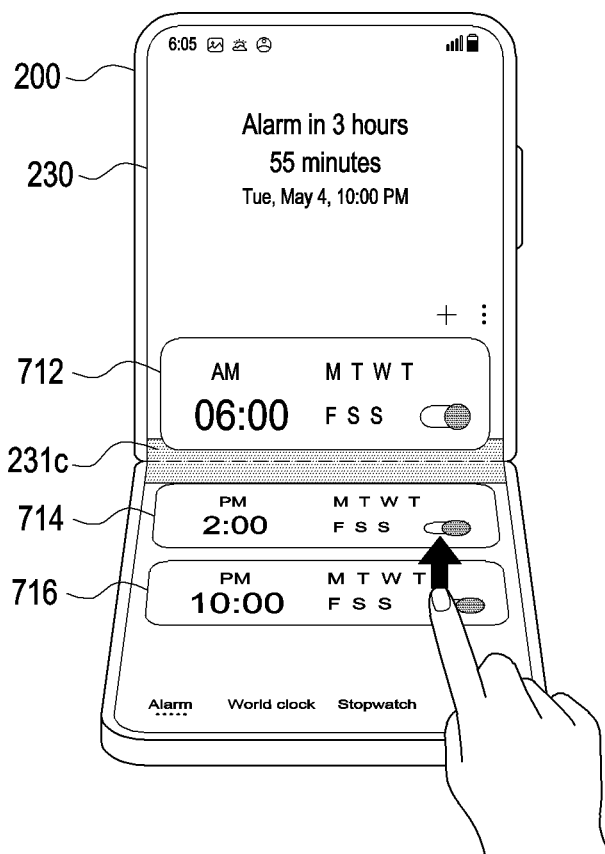
FIG. 11A illustrates an embodiment in which, when a visual object according to an embodiment of the disclosure is a second type object (e.g., an object having a relative position value) and when a user input is received, a position movement function or operation according to an embodiment of the disclosure is applied to the visual object.
Figure 11B:
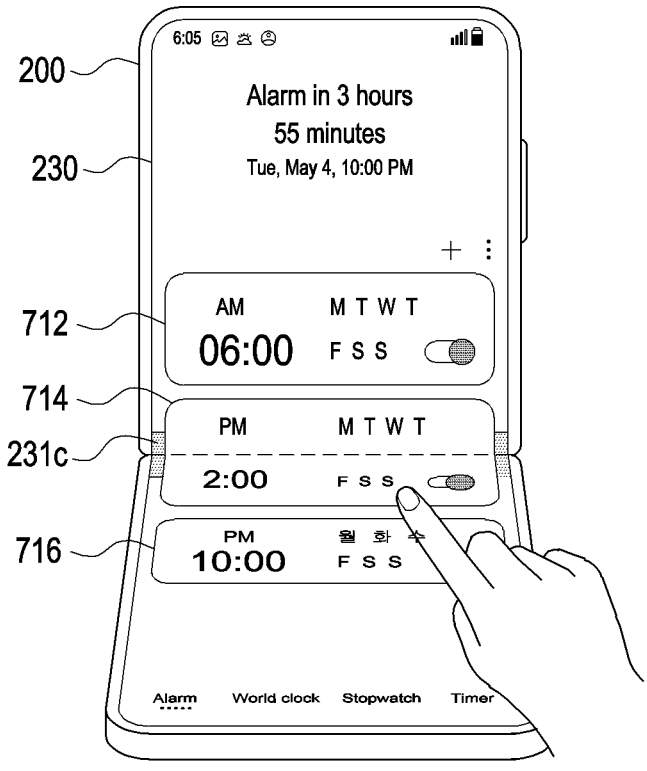
FIG. 11B illustrates a moved position of the visual object of FIG. 11A.
Figure 11C:
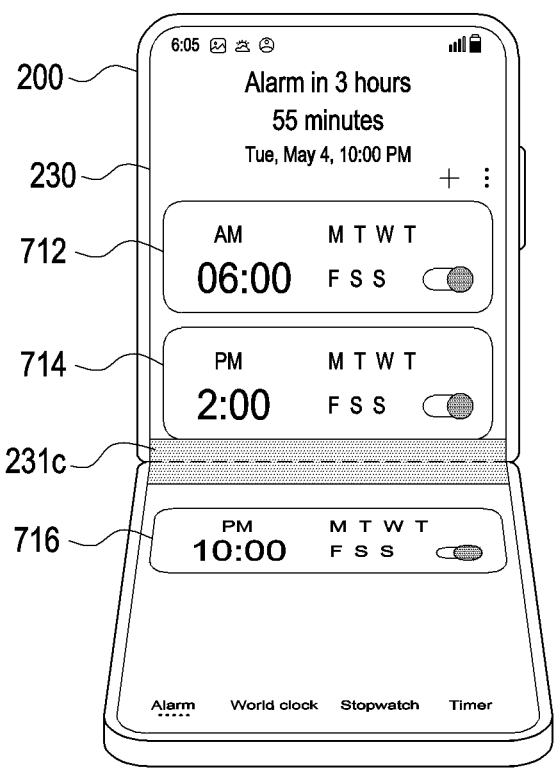
FIG. 11C illustrates the visual object of FIG. 11B, in a further moved position.

Referring to FIGS. 10A to 10F, as illustrated in 10A, when the visual object 710 is a second type object (e.g., an object having a relative position value) and when multiple objects (e.g., the first visual object 712, a second visual object 714, and a third visual object 716) are displayed, the foldable device 200 according to an embodiment of the disclosure may move the position of the second visual object 714 and then may determine positions of the other visual objects 712, 716 according to the direction of movement of the second visual object 714. FIGS. 10D-10E illustrate the coordinates of the first visual object 712, the second visual object 714, and the third visual object 716, respectively. The foldable device 200 according to an embodiment of the disclosure may compare results of $|Y_5 - 420|$ and $|Y_6 - 420|$. ① In case of $|Y_5 - 420| > |Y_6 - 420|$, the foldable device 200 according to an embodiment of the disclosure may move the second visual object 714 by a $Y_6 - Y_1$ value in a second direction (e.g., the upper-side surface) and display the second visual object 714. ② In case of $|Y_5 - 420| = |Y_6 - 420|$ and in case of $|Y_5 - 420| < |Y_6 - 420|$, the foldable device 200 according to an embodiment of the disclosure may move the second visual object 714 by a $|Y_5 - Y_2|$ value in a first direction (e.g., the lower-side surface) and display the second visual object 714. In this case, when the second visual object 714 is moved in the second direction (e.g., the upper-side surface) as illustrated in 10B, the foldable device 200 according to an embodiment of the disclosure may move the first visual object 712 by a $Y_6 - Y_1$ value in the second direction (e.g., the upward direction) and display the first visual object 712. Furthermore, with respect to the third visual object 716, ① in case of $Y_7 - Y_2 = 0$ and in case of $Y_7 - Y_2 > 0$, the foldable device 200 according to an embodiment of the disclosure may not move the position of the third visual object 716, and ③ in case of $Y_7 - Y_2 < 0$, the foldable device 200 may move the third visual object 716 by $|Y_7 - Y_2|$ in the first direction (e.g., the downward direction) and display the third visual object 716. The foldable device 200 according to an embodiment of the disclosure may move the position of the third visual object 716 by $|Y_5 - Y_2|$ in the first direction when the second visual object 714 is moved in the first direction (e.g., the lower-side surface) as illustrated in FIG. 10C. Furthermore, ① in case of $Y_4 - Y_1 = 0$ and in case of $Y_4 - Y_1 < 0$, the foldable device 200 according to an embodiment of the disclosure may not move the position of the first visual object 712, and, ② in case of $Y_4 - Y_1 > 0$, the foldable device

200 may move the position of the first visual object 712 by $Y_4-Y_1$ in the second direction (e.g., the upward direction) and display first visual object 712. The foldable device 200 according to another embodiment of the disclosure may move, in case of $Y_4-Y_1=0$ and in case of $Y_4-Y_1<0$, the position of the first visual object 712 such that the first visual object 712 is in contact with the boundary of the folding area 231c. FIG. 10C illustrates a case in which, in case of $Y_4-Y_1=0$ and in case of $Y_4-Y_1<0$, the position of the first visual object 712 is moved so as to be in contact with the boundary of the folding area 231c.

Referring to FIG. 11A, when the visual object is a second type object (e.g., an object having a relative position value) and when multiple objects (e.g., the first visual object 712, the second visual object 714, and the third visual object 716) are displayed, the foldable device 200 according to an embodiment of the disclosure may receive a user input (e.g., a gesture to scroll an object) for any one object (e.g., the third visual object 716). As illustrated in FIG. 11B, the display position of the multiple objects (e.g., the first visual object 712, the second visual object 714, and the third visual object 716) according to an embodiment of the disclosure may be changed depending on a user input. As illustrated in FIG. 11C, after the user input is ended, the foldable device 200 according to an embodiment of the disclosure may move and display positions of the multiple objects (e.g., the first visual object 712, the second visual object 714, and the third visual object 716), based on the position movement function or operation according to various embodiments of the disclosure. Furthermore, when a user input is received after movement of the position of the visual object 710 is completed, the foldable device 200 according to an embodiment of the disclosure may receive the user input in the state in which the position movement is completed. Furthermore, according to an embodiment of the disclosure, when the multiple objects (e.g., the first visual object 712, the second visual object 714, and the third visual object 716) are moved by switching of a screen on which the multiple objects (e.g., the first visual object 712, the second visual object 714, and the third visual object 716) are overlaid, positions of the multiple objects (e.g., the first visual object 712, the second visual object 714, and the third visual object 716) may be moved and displayed as illustrated in FIG. 11C based on the position movement function or operation according to various embodiments of the disclosure in the state in which the movement of the multiple objects (e.g., the first visual object 712, the second visual object 714, and the third visual object 716) is completed.

Figure 12A:
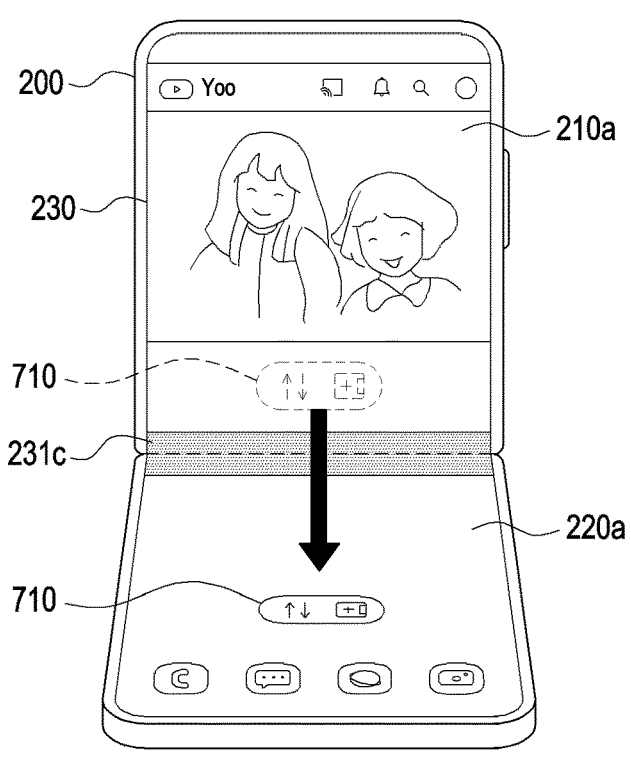
FIG. 12A illustrates an embodiment in which, when a visual object according to an embodiment of the disclosure is a floating button or an edge button, a position movement function or operation according to an embodiment of the disclosure is applied to the visual object, with FIG. 12A illustrating a floating button movement.
Figure 12B:
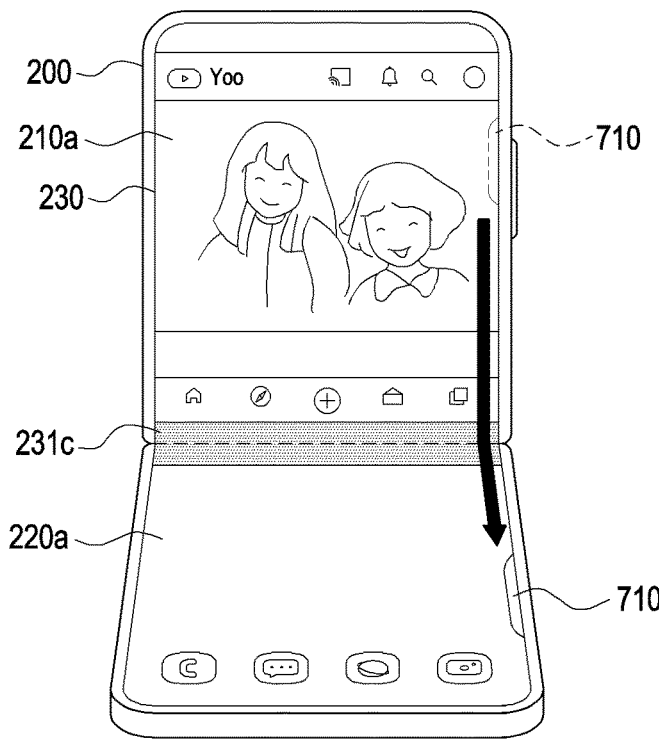
FIG. 12B illustrates an edge button movement in accordance with an embodiment.
Figure 12C:
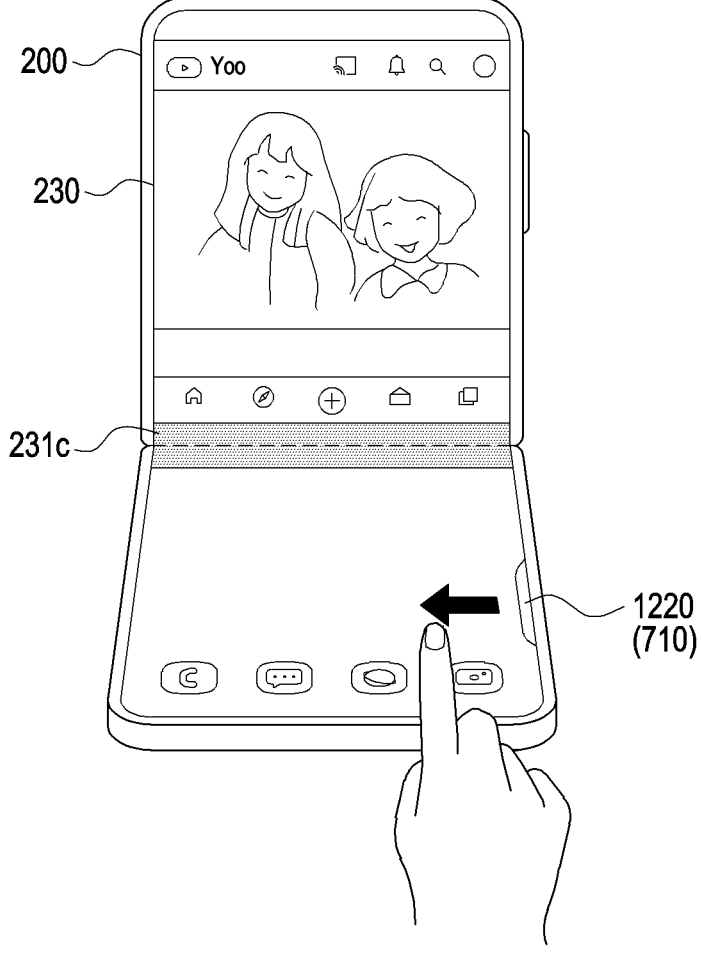
FIG. 12C illustrates another edge button movement in accordance with an embodiment.
Figure 12D:
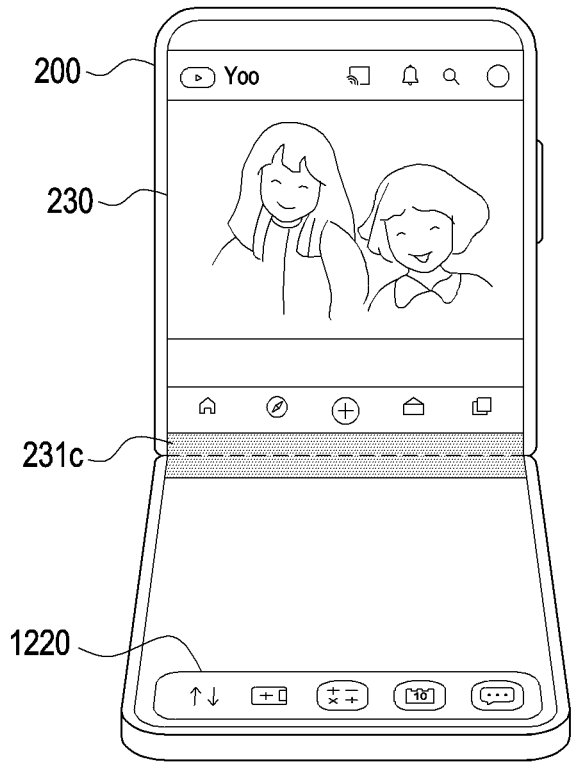
FIG. 12D illustrates various objects on a display in accordance with an embodiment.

Referring to FIG. 12A, when the foldable device 200 according to an embodiment of the disclosure is folded by a predesignated angle or less, the foldable device 200 may move the position of a visual object 710 displayed in the folding area 231c or the upper-side surface (e.g., the first surface 210a) of the foldable device 200 to the lower-side surface (e.g., the third surface 220a) and display the visual object 710. In FIG. 12A, a floating button for controlling a multi-window is illustrated as an example of the visual object 710. Referring to FIG. 12B, when the foldable device 200 according to an embodiment of the disclosure is folded by the predesignated angle or less, the foldable device 200 may move the position of the visual object 710 displayed in the folding area 231c or the upper-side surface (e.g., the first surface 210a) of the foldable device 200 to the lower-side surface (e.g., the third surface 220a) and display the visual object 710. In FIG. 12C, an edge button for calling a tray 1220 is illustrated as an example of the visual object 710. When a user input (e.g., a swipe gesture) for the edge button is received as illustrated in FIG. 12C, the foldable device 200 according to an embodiment of the disclosure may display, as illustrated in FIG. 12D, the tray 1220 on the lower-side surface (e.g., the third surface 220a) of the foldable device 200 such that the tray 1220 does not overlap the folding area 231c.

When it is determined that the visual object 710 is an object to which the position movement function or operation is not applied, in operation 370, the foldable device 200 according to an embodiment of the disclosure may display the visual object 710 in a current position (i.e., no moving or adjusting of the position of the visual object is performed).

Figure 14A:
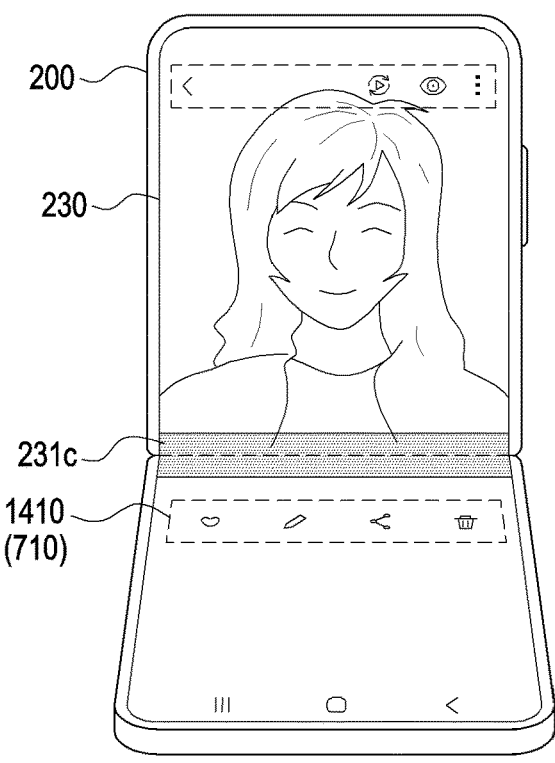
FIG. 14A illustrates a view in which the function or operation illustrated in FIG. 13 is embodied from the point of view of a user interface.
Figure 14B:
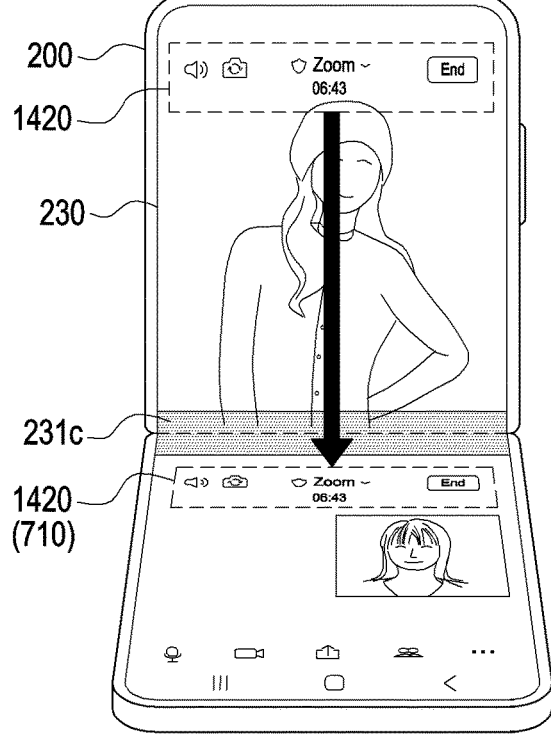
FIG. 14B illustrates another view of the user interface of FIG. 14A.
Figure 15A:
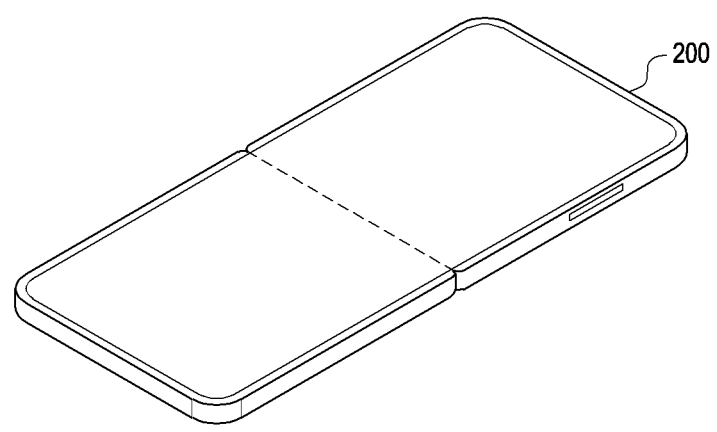
FIG. 15A illustrates a function or operation in which a folding area according to an embodiment of the disclosure is changed depending on a folding angle of a foldable device, with FIG. 15A illustrating the foldable device in an unfolded state.
Figures 15B, 15C:
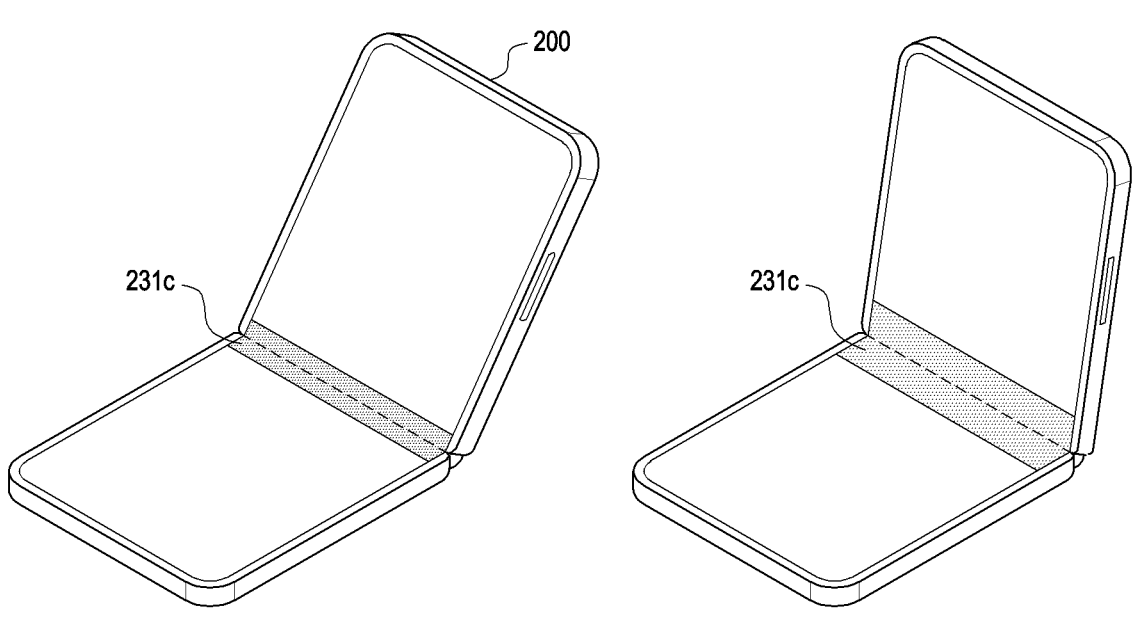
FIG. 15B illustrates the foldable device of FIG. 15A in a first folded angle state.
FIG. 15C illustrates the foldable device of FIG. 15A in a second folded angle state.

FIG. 13 illustrates a function or operation by which a visual object according to an embodiment of the disclosure moves from a first area (e.g., an upper-side surface) to a second area (e.g., a lower-side surface) according to folding of a foldable device. FIGS. 14A and 14B are illustrative views in which the function or operation of FIG. 13 is embodied from the point of view of a user interface. FIGS. 15A-15C are illustrations of a function or operation in which a folding area 231c according to an embodiment of the disclosure is changed depending on a folding angle of a foldable device 200.

In operation 1310, the foldable device 200 according to an embodiment of the disclosure may detect that the folding angle is equal to or less than a predesignated angle. The foldable device 200 according to an embodiment of the disclosure may use a sensor included in the foldable device 200 to detect that the folding angle 410 is equal to or less than the predesignated angle. According to various embodiments of the disclosure, various techniques for detecting the angle of the foldable device 200 may be used to detect that the folding angle 410 is equal to or less than the predesignated angle. For example, referring again to FIG. 4A, an angle when the foldable device 200 according to an embodiment of the disclosure is substantially completely folded may be defined as 180 degrees. Referring to FIG. 4B, the folding angle 410 of the foldable device 200 according to an embodiment of the disclosure may be defined as an angle formed by the first housing 210 and the second housing 220 or an angle formed by the first surface 210a and the third surface 220a. The predesignated angle according to an embodiment of the disclosure may be, for example, 135 degrees, although other angles may be set as the predesignated angle without departing from the scope of the present disclosure.

In operation 1320, the foldable device 200 according to an embodiment of the disclosure may detect that at least one visual object 710 is displayed in a first area of the foldable device 200. Referring to FIG. 14A, a first action bar 1410 including various objects for controlling a screen displayed on the foldable device 200 are illustrated as an example of the visual object 710 according to an embodiment of the disclosure. When it is detected that the folding angle of the foldable device 200 is equal to or less than the predesignated angle, the foldable device 200 according to an embodiment of the disclosure may move the position of the first action bar 1410 in a second direction (e.g., the downward direction) and display the first action bar 1410. Referring to FIG. 14B, a second action bar 1420 including various objects for controlling a screen displayed in performing a video call is illustrated as an example of the visual object 710 according to an embodiment of the disclosure. When it is detected that the folding angle of the foldable device 200 is equal to or less than the predesignated angle, the foldable device 200 according to an embodiment of the disclosure may move the position the second action bar 1420 in the second direction (e.g., the downward direction) and display the second action bar. Positions of objects (e.g., the first action bar 1410 and the second action bar 1420) moved according to various embodiments of the disclosure may be predetermined, or may be designated by a user. Referring to FIGS. 15A-15C, the folding area 231*c* according to an embodiment of the disclosure may be configured to be changed depending on the folding angle. For example, as illustrated in FIG. 15C, the area of the folding area 231*c* when the folding angle is 80 degrees may be wider than the area of the folding area 231*c* when the folding angle is 135 degrees (e.g., as shown in FIG. 15B). Further, as shown, in the fully open state (e.g., folding angle of 180 degrees), the folding area 231*c* may be omitted and no moving of visual objects performed. That is, in accordance with some embodiments of the present disclosure, the folding are 231*c* may only be active or activated upon a folding of the foldable device 200 beyond the predesignated angle (e.g., folding angle is equal to or less than the predesignated angle).

Figure 16A:
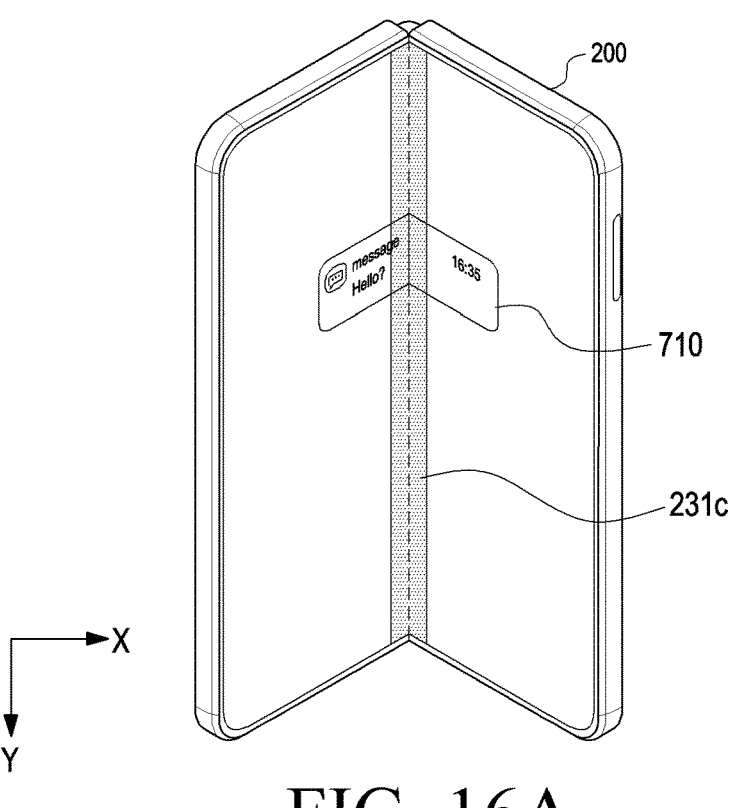
FIG. 16A illustrates an embodiment in which a position movement function or operation according to an embodiment of the disclosure is applied to a visual object in a foldable device having a longitudinally formed folding axis.
Figure 16B:
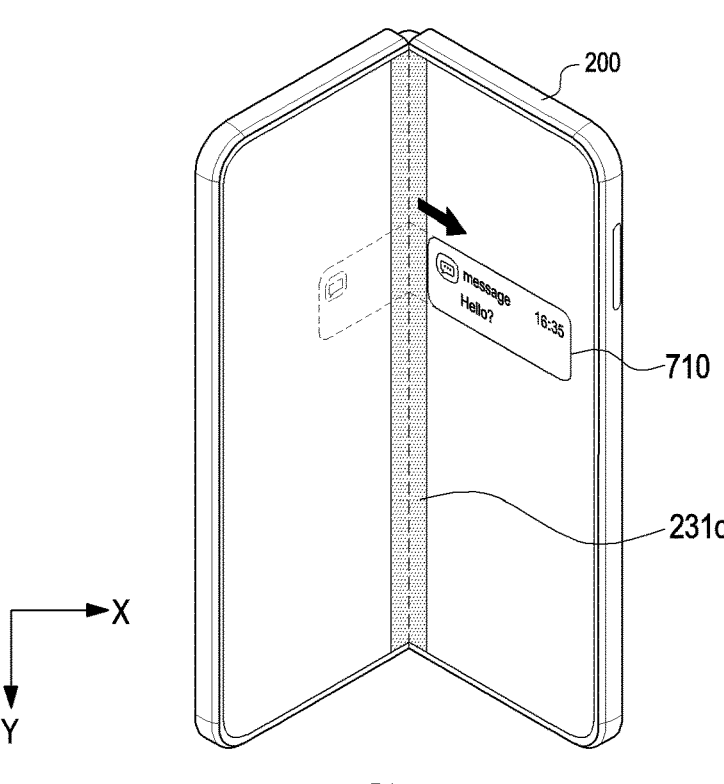
FIG. 16B illustrates movement of the visual object on the foldable device of FIG. 16A.

FIGS. 16A and 16B are illustrative views of an embodiment in which a position movement function or operation according to an embodiment of the disclosure is applied to a visual object 710 in a foldable device 200 having a longitudinally formed folding axis.

Referring to FIG. 16A, the foldable device 200 according to an embodiment of the disclosure may detect that at least a part of the visual object 710 is located in a folding area 231*c*. In this case, the foldable device 200 according to an embodiment of the disclosure may compare an X-axis coordinate of the folding area 231*c* with an X-axis coordinate of the visual object 710, thereby moving and displaying the position of the visual object 710 such that the visual object 710 is substantially in contact with the folding area 231*c* as illustrated in FIG. 16B.

A foldable device (e.g., the electronic device 101 in FIG. 1 or the foldable device 200 in FIG. 2) according to an embodiment of the disclosure may include at least one sensor (e.g., the sensor module 176 in FIG. 1), a flexible display (e.g., the display module 160 in FIG. 1), and at least one processor (e.g., the processor 120 in FIG. 1), wherein the at least one processor is configured to detect a folding angle of the foldable device by using the at least one sensor, detect that at least a part of a visual object is displayed in a folding area of the foldable device, and when the detected folding angle is equal to or less than a predesignated angle, move, based on the displaying of the at least part of the visual object in the folding area, the visual object to an area other than the folding area and display the visual object.

A foldable device (e.g., the electronic device 101 in FIG. 1 or the foldable device 200 in FIG. 2) according to an embodiment of the disclosure may include at least one sensor (e.g., the sensor module 176 in FIG. 1), a flexible display (e.g., the display module 160 in FIG. 1), and at least one processor (e.g., the processor 120 in FIG. 1), wherein the at least one processor is configured to detect a folding angle of the foldable device by using the at least one sensor, detect that at least one visual object is displayed in a first area of the foldable device, the at least one visual object including at least one object for controlling a screen displayed on the flexible display, and when the sensed folding angle is equal to or less than a predesignated angle, move, based on the displaying of the at least one visual object in the first area, the at least one visual object to a second area different from the first area and display the at least one visual object, the first area and the second area being areas which are distinguished from each other with reference to a folding axis of the foldable device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distrib- uted in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be tempo- rarily generated or at least temporarily stored in the machine-readable storage medium, such as memory of the manufacturer's server, a server of the application store, or a relay server.

According to an embodiment of the disclosure, each component (e.g., a module or a program) of the above- described components may include a single entity or mul- tiple entities, and some of the multiple entities may be separately disposed in different components. According to an embodiment of the disclosure, one or more of the above-described components or operations may be omitted, or one or more other components or operations may be added. Alternatively or additionally, a plurality of compo- nents (e.g., modules or programs) may be integrated into a single component. In such a case, the integrated component may still perform one or more functions of each of the plurality of components in the same or similar manner as they are performed by a corresponding one of the plurality of components before the integration. According to an embodiment of the disclosure, operations performed by the module, the program, or another component may be carried out sequentially, in parallel, repeatedly, or heuristically, or one or more of the operations may be executed in a different order or omitted, or one or more other operations may be added.

What is claimed is:

1. A foldable device comprising:
   at least one sensor configured to detect a folding angle of the foldable device;
   memory storing instructions,
   a flexible display, wherein the flexible display includes a folding area, a first area including an area above the folding area, and a second area including an area below the folding area, and
   at least one processor,
   wherein the instructions that, when executed by the at least one processor individually or collectively, cause the foldable device to:
   detect, using the at least one sensor, the folding angle of the foldable device,
   based on the folding angle being equal to or less than a predesignated angle, identify a display position where a visual object is displayed on a part of the first area of the flexible display or on a part of the second area of the flexible display by calculating a difference of Y values of the folding area and the visual object, wherein at least a part of the visual object is displayed in the folding area of the flexible display,
   responsive to the visual object being displayed on the part of the first area of the flexible display, move and display the visual object in an upward direction such that a lower border of the visual object contacts with an upper border of the folding area by moving the visual object based on a value of the difference of the Y values, and
   responsive to the visual object being displayed on the second area of the flexible display, move and display the visual object in a downward direction such that an upper border of the visual object contacts with a lower border of the folding area by moving the visual object based on summing a first Y value and a second Y value of the visual object to an absolute value of the differ- ence of Y values of the folding area and the visual object.

2. The foldable device of claim 1, wherein the instructions cause the foldable device to determine whether the visual object is an object comprising an icon, a virtual button, a switch, or an interactional element.

3. The foldable device of claim 1, wherein instructions cause the foldable device to determine whether the visual object is a first type object displayed in a predesignated fixed position on the flexible display, or a second type object in which a display position of the visual object is changeable on the flexible display.

4. The foldable device of claim 3, wherein the instructions cause the foldable device to compare, when the visual object is determined to be the second type object, coordinates of the folding area with coordinates of the visual object to move the visual object positioned in at least a partial area of the folding area to a first area or a second area that is different than the folding area and display the visual object in the respective first area or second area.

5. The foldable device of claim 1, wherein the instructions cause the foldable device to move, when a user input for the visual object is detected and when the user input is released, the visual object to the area other than folding area and display the visual object in the area other than the folding area.

6. The foldable device of claim 1, wherein a size of the folding area is changed depending on a folding angle of the foldable device or a user's configuration.

7. A method for controlling a foldable device, the method comprising:
   detecting, using at least one sensor of the foldable device, a folding angle of the foldable device,
   based on the folding angle being equal to or less than a predesignated angle, identifying a display position where a visual object is displayed on a part of a first area of a flexible display or on a part of a second area of the flexible display by calculating a difference of Y values of a folding area and the visual object, wherein at least a part of the visual object is displayed in the folding area of the flexible display,
   responsive to the visual object being displayed on the part of the first area of the flexible display, moving and displaying the visual object in an upward direction such that a lower border of the visual object contacts with an upper border of the folding area by moving the visual object based on a value of the difference of the Y values, and
   responsive to the visual object being displayed on the second area of the flexible display, moving and dis- playing the visual object in a downward direction such that an upper border of the visual object contacts with a lower border of the folding area by moving the visual object based on summing a first Y value and a second Y value of the visual object to an absolute value of the difference of Y values of the folding area and the visual object.

8. The method of claim 7, further comprising determining whether the visual object is an object comprising an icon, a virtual button, a switch, or an interactional element.

9. The method of claim 7, further comprising determining whether the visual object is a first type object displayed in a predesignated fixed position on the flexible display, or a second type object in which a display position of the visual object is changeable on the flexible display.

10. The method of claim 9, further comprising, in response to determining the visual object is the second type object, comparing coordinates of the folding area with coordinates of the visual object to move the visual object positioned at least a partial area of the folding area to a first area or a second area other than the folding area and display the visual object in the respective first area or second area.

11. One or more non-transitory computer-readable storage media storing computer-executable instructions that, when executed by one or more processors of a foldable device individually or collectively, cause the foldable device to perform operations, the operations comprising:

detecting, using at least one sensor of the foldable device, a folding angle of the foldable device, based on the folding angle being equal to or less than a predesignated angle, identifying a display position where a visual object is displayed on a part of a first area of a flexible display or on a part of a second area of the flexible display by calculating a difference of Y values of a folding area and the visual object, wherein at least a part of the visual object is displayed in the folding area of the flexible display, responsive to the visual object being displayed on the part of the first area of the flexible display, moving and displaying the visual object in an upward direction such that a lower border of the visual object contacts with an upper border of the folding area by moving the visual object based on a value of the difference of the Y values, and responsive to the visual object being displayed on the second area of the flexible display, moving and displaying the visual object in a downward direction such that an upper border of the visual object contacts with a lower border of the folding area by moving the visual object based on summing a first Y value and a second Y value of the visual object to an absolute value of the difference of Y values of the folding area and the visual object.

* * * * *